US008266527B2

(12) United States Patent
Matsuura

(10) Patent No.: US 8,266,527 B2
(45) Date of Patent: Sep. 11, 2012

(54) ELECTRONIC ALBUM CREATING APPARATUS, ELECTRONIC ALBUM EDITING APPARATUS, INFORMATION PROCESSING SYSTEM, ELECTRONIC ALBUM CREATING METHOD, AND STORAGE MEDIUM STORING PROGRAM

(75) Inventor: Kenichiro Matsuura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 854 days.

(21) Appl. No.: 11/946,192

(22) Filed: Nov. 28, 2007

(65) Prior Publication Data

US 2008/0141108 A1 Jun. 12, 2008

(30) Foreign Application Priority Data

Dec. 7, 2006 (JP) ................................ 2006-331135
Dec. 7, 2006 (JP) ................................ 2006-331139

(51) Int. Cl.
*G06N 3/00* (2006.01)
(52) U.S. Cl. ...................................... 715/255
(58) Field of Classification Search .............. 715/200, 715/234, 243, 253, 254, 255
See application file for complete search history.

(56) References Cited

U.S. PATENT DOCUMENTS 6,567,983 B1 * 5/2003 Shiimori ....................... 725/105

2003/0210429 A1   11/2003 Yamashita
2007/0170250 A1 *  7/2007 Bystrom et al. ............... 235/382

FOREIGN PATENT DOCUMENTS

| JP | 07-282003 A | 10/1995 |
| JP | 2000-030073 A | 1/2000 |
| JP | 2000-148750 A | 5/2000 |
| JP | 2006-072850 | 3/2006 |
| JP | 2006-099732 A | 4/2006 |
| JP | 2006-121656 A | 5/2006 |
| JP | 2006-127490 A | 5/2006 |

OTHER PUBLICATIONS

The above reference was cited in a Mar. 26, 2012 Japanese Office Action, which is enclosed without English Translation, that issued in Japanese Patent Application No. 2006-331139.
The above references were cited in a Jul. 27, 2012 Japanese Office Action, a copy of which is enclosed without an English translation, that issued in Japanese Application No. JP2006-331139.

* cited by examiner

*Primary Examiner* — Kyle Stork
(74) *Attorney, Agent, or Firm* — Cowan, Liebowitz & Latman, P.C.

(57) ABSTRACT

An apparatus of an original album editor uploads to a server album data in which instructions of allowed object that allows editing and information on content type of editing allowed for the allowed object are embedded. An apparatus of an admitted subscriber downloads the album data from the server, and edits the album data within allowance in accordance with the instructions and information embedded in the album data.

10 Claims, 33 Drawing Sheets

FIG. 2
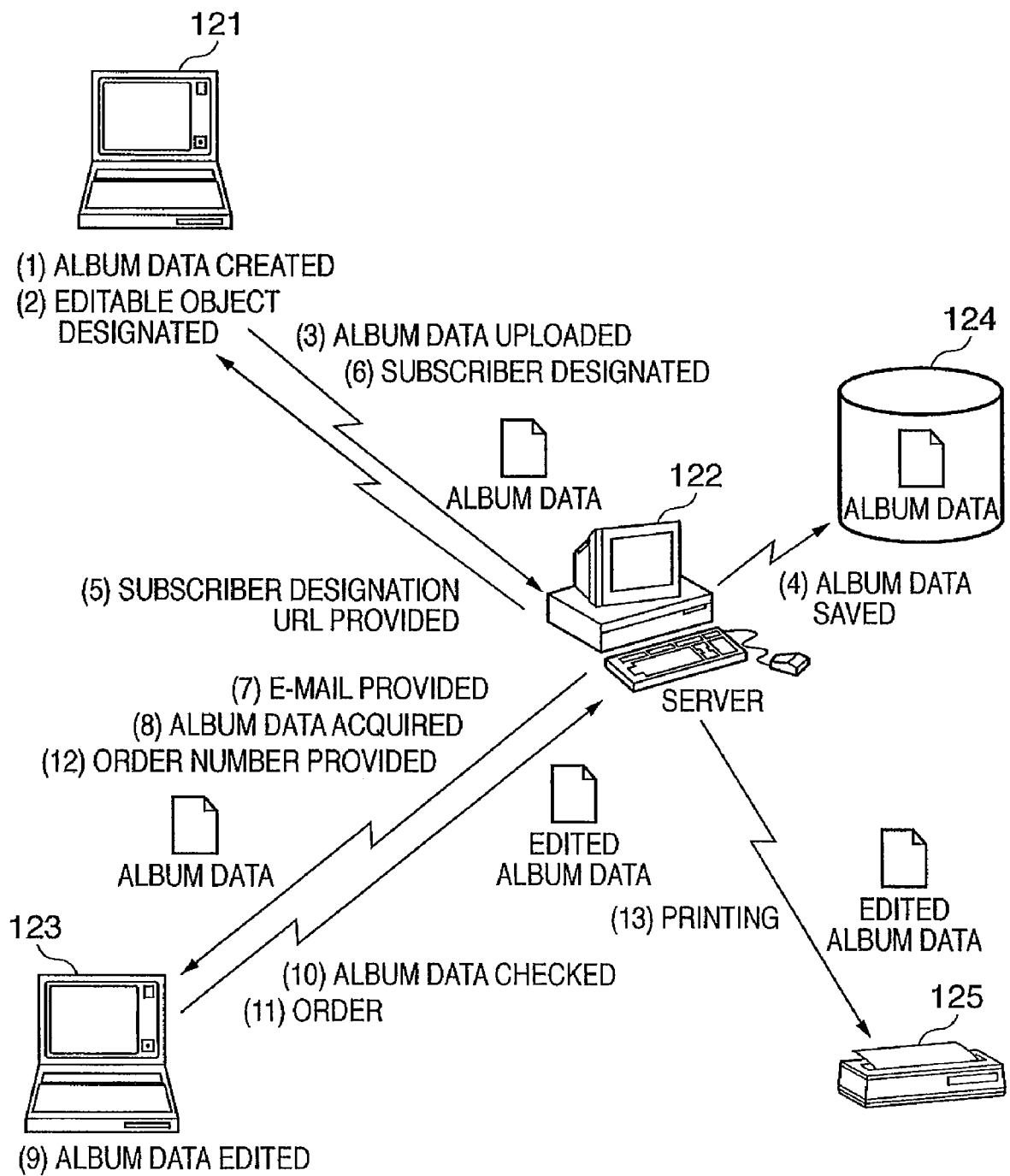

FIG. 3A

P301 — EDITING...
P302 — EDITING RELEASED

FIG. 3B

EDITING

P311 — EDITING...
P312 — EDITING RELEASED

FIG. 5

```
7 0 obj            7 0 obj           a2    6 0 obj
<<          a1     <<                      <<                a3
/ Length 34        / Length 34             / Type / XObject
>>                 / Editable <</ Type [1 2 3]  / Name / R6
stream                         / Id 9876543210>>  / Subtype / Image
q                  >>                     / Length 921600
100 0 0 100 0 0 cm stream                 / ColorSpace / DeviceRGB
/ R6  Do           q                      / Width 640
Q                  100 0 0 100 0 0 cm     / Height 480
endstream          / R6  Do               / BitsPerComponent 8
endobj             Q                      >>
                   endstream              stream
                   endobj                 :
                                          endstream
                                          endobj 5 0 obj
                                          <<                b2
                                          / Length 44
5 0 obj     b1                            / Editable <</ Type [1 2 3]
<<                                                    Id 1234567890>>
/ Length 44                               >>
>>                                        stream
stream                                    BT
BT                                        / Font 18 Tf
/ Font1 18 Tf                             100 100 Td (Test) Tj
100 100 Td (Test) Tj                      ET
ET                                        endstream
endstream                                 endobj
endobj
                                          4 0 obj
                                          <<                c2
                                          / Length 25
4 0 obj                                   / Editable <</ Type [1]
<<          c1                                        / Id 9753186420>>
/ Length 25                               >>
>>                                        stream
stream                                    100 100 m
100 100 m                                 200 200 l
200 200 l                                 S
S                                         endstream
endstream                                 endobj
endobj
                                          1 0 obj
                                          << / Type / Catalog   d2
                                          / Pages 2 0 R
1 0 obj     d1                            / PageMode / UseOutlines
<< / Type / Catalog                       / Outlines 3 0 R
/ Pages 2 0 R                             / Editable << / Type / Specified
/ PageMode / UseOutlines                              / Id 1357924680>>
/ Outlines 3 0 R                                      / User 6789012345>>
/ Editable << / Type / Specified                      / File 5432109876>>
              / Id 1357924680>>
>>                                        >>
endobj                                    endobj
```

FIG. 12

GUI12

BILLING / SHIPPING INPUT

ENTER BILLING ADDRESS AND NAME

ADDRESS ~P1201
NAME ~P1202

ENTER SHIPPING ADDRESS AND NAME

ADDRESS ~P1203
NAME ~P1204

OK  CANCEL
P1210  P1211

FIG. 13

GUI13

ORDER CONTENT CONFIRMATION

AFTER CONFIRMING YOUR ORDER, PRESS THE OK BUTTON. P1301

| ITEM | PRICE | QUANTITY | SUBTOTAL |
|---|---|---|---|
| PRINTING COST | 1000YEN | 2 | 2000YEN |
| SHIPPING COST | 500YEN | 1 | 500YEN |
| TOTAL | | | 4500YEN |

OK  P1310

CANCEL  P1311

FIG. 18

```
7 0 obj         a1
<<
/ Length 34
>>
stream
q
100 0 0 100 0 0 cm
/ R6  Do
Q
endstream
endobj
```

```
7 0 obj              a2'
<<
/ Length 34
/ Editable <</ Type [1 2 3]
           / Icon [200 200] >>
>>
stream
q
100 0 0 100 0 0 cm
/ R6  Do
Q
endstream
endobj
```

```
6 0 obj              a3
<<
/ Type / XObject
/ Name / R6
/ Subtype / Image
/ Length 921600
/ ColorSpace / DeviceRGB
/ Width 640
/ Height 480
/ BitsPerComponent 8
>>
stream
 :
endstream
endobj
```

```
5 0 obj         b1
<<
/ Length 44
>>
stream
BT
/ Font1 18 Tf
100 100 Td (Test) Tj
ET
endstream
endobj
```

```
5 0 obj              b2'
<<
/ Length 44
/ Editable <</ Type [1 2 3]
           / Icon [200 200] >>
>>
stream
BT
/ Font 18 Tf
100 100 Td (Test) Tj
ET
endstream
endobj
```

```
4 0 obj         c1
<<
/ Length 25
>>
stream
100 100 m
200 200 l
S
endstream
endobj
```

```
4 0 obj              c2'
<<
/ Length 25
/ Editable <</ Type [1]
           / Icon [200 200] >>
>>
stream
100 100 m
200 200 l
S
endstream
endobj
```

F I G. 20
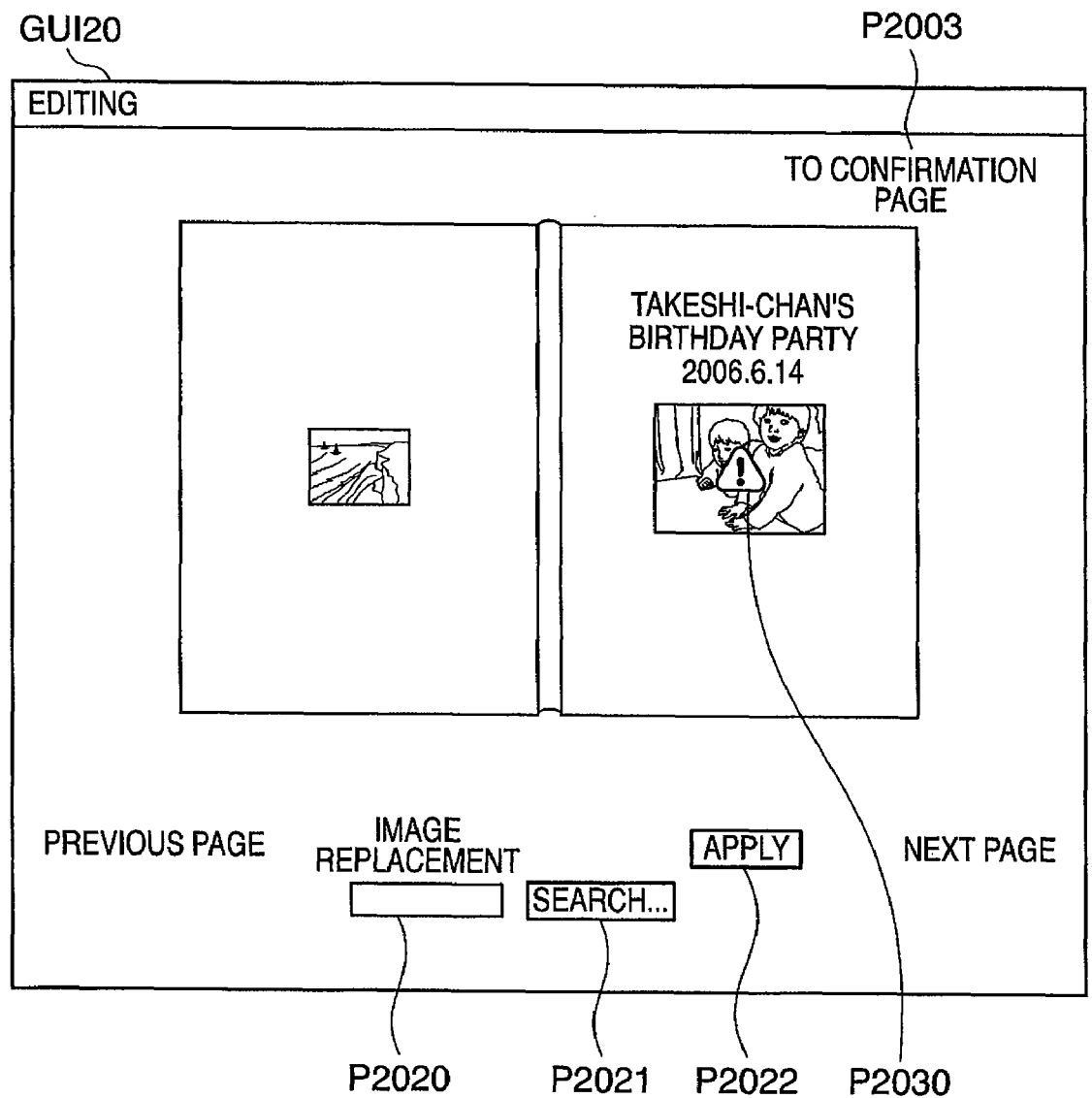

FIG. 28

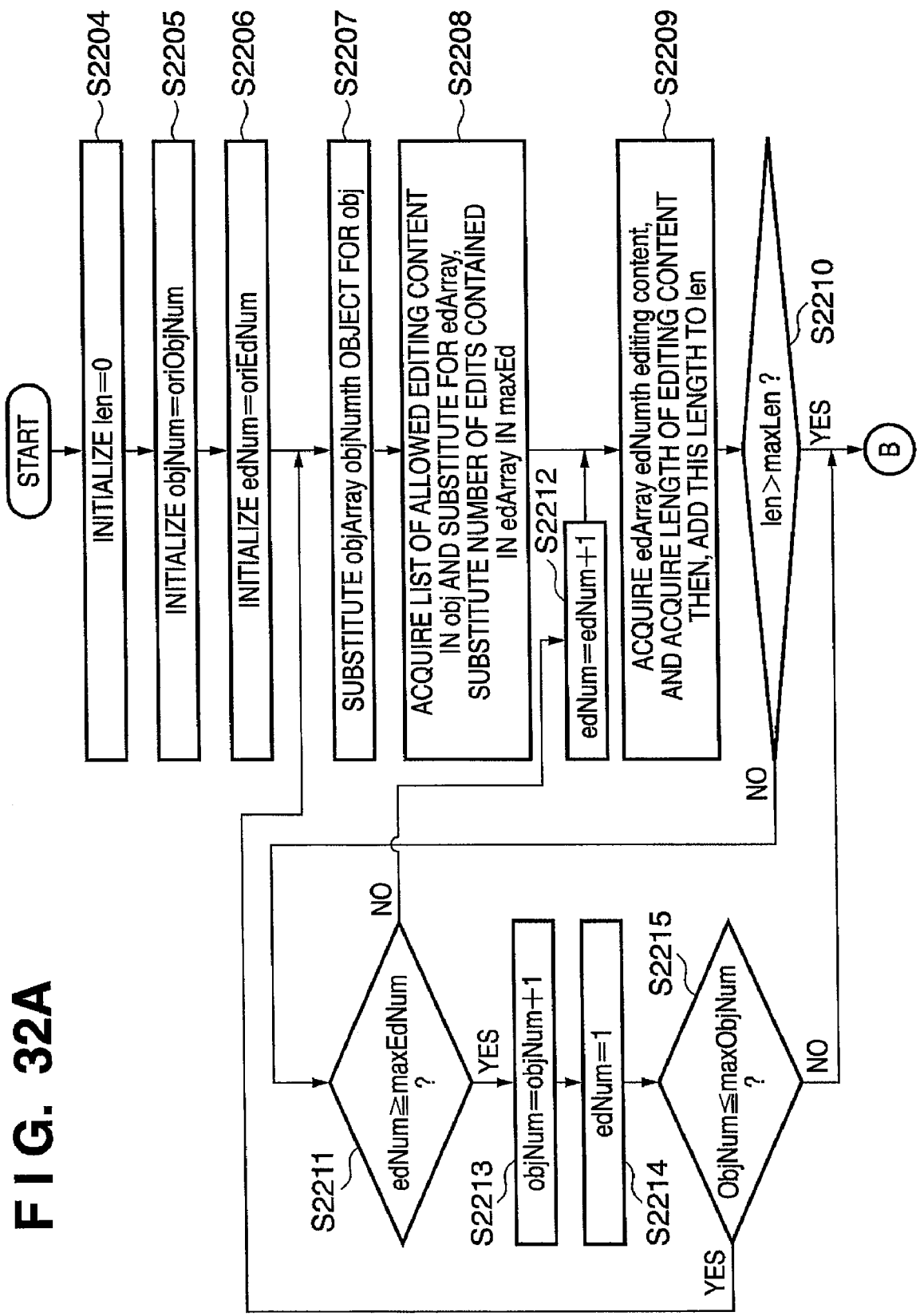

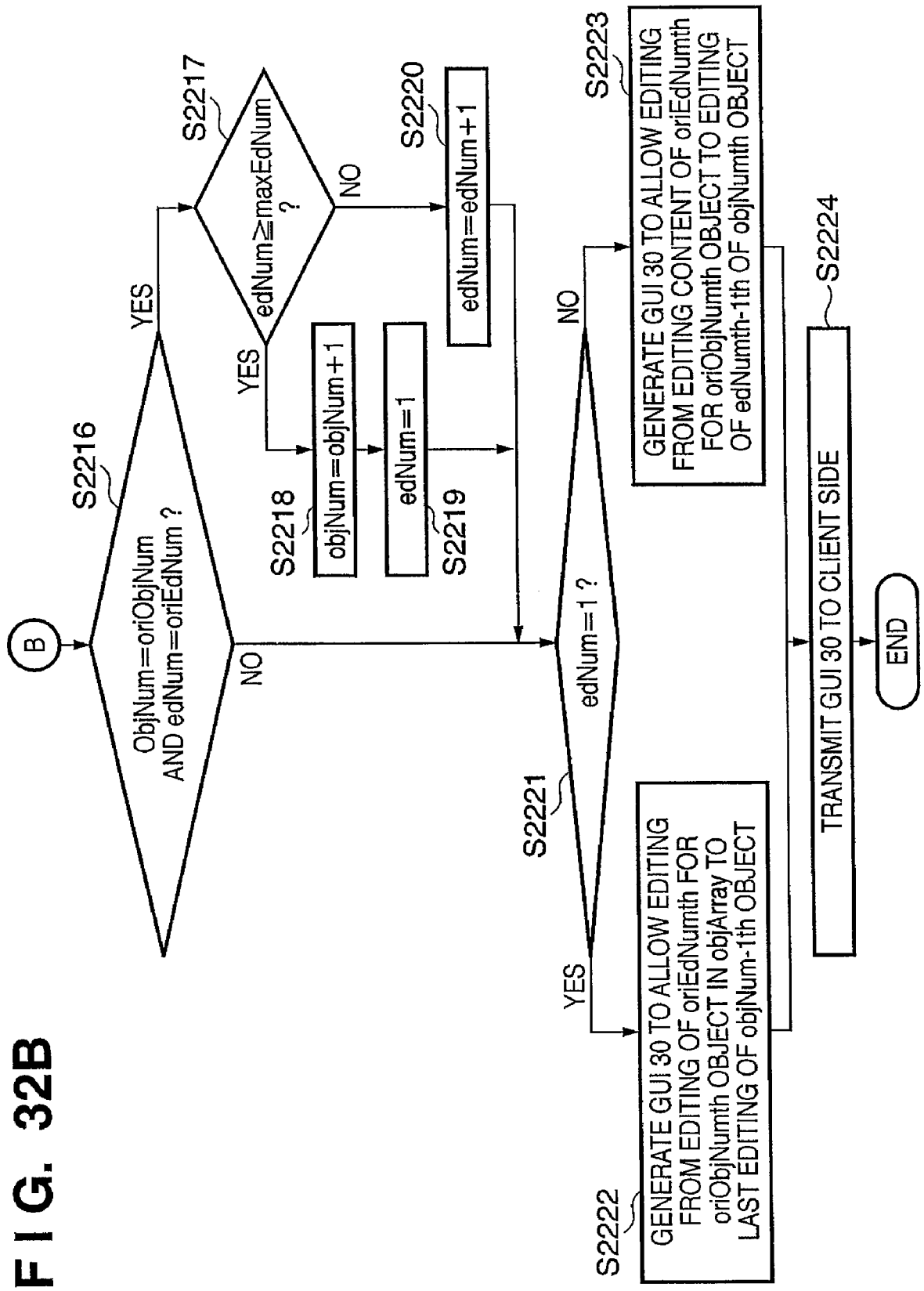
F I G. 32B

ELECTRONIC ALBUM CREATING APPARATUS, ELECTRONIC ALBUM EDITING APPARATUS, INFORMATION PROCESSING SYSTEM, ELECTRONIC ALBUM CREATING METHOD, AND STORAGE MEDIUM STORING PROGRAM

BACKGROUND OF THE INVENTION

1. Field of the Invention

The present invention relates to an electronic album creating apparatus, an electronic album editing apparatus, an information processing system, an electronic album creating method, and a storage medium storing program capable of making a multimedia object forming album data on the electronic album creating apparatus editable for the electronic album editing apparatus through a network.

2. Description of the Related Art

In recent years, with the development of communication systems and information communication technologies, a variety of information providing services that make use of the Internet have been developed. With information providing services that make use of the Internet, it is possible to provide information not only by text but also so-called multimedia information, which includes images and sound as well. It is against this background that the provision and mail-order sale of services linked to multimedia information through the Internet has now become commonplace, and the number of users of these services has increased as well.

In addition, with the spread of digital cameras and the like, services by which prints of images sensed using a digital camera can be ordered over the Internet have begun to take hold as well. Among such services, although there are some that merely print digital image data as is, others retouch the image data, or use the image data as material and edit it to make new album data. As an example of the former, there is printing of image data sensed using a digital camera onto photographic paper. As an example of the latter, printing and binding of albums using the image data is typical.

As one method of editing for the purpose of creating new album data, in an application on a client side terminal apparatus of a client that is connected to a network there can be instruction of the disposition of objects such as images, character sequences, drawings and the like, as well as the type and size of the font used to display the characters. Then, the edited data completed at the application on the client side terminal apparatus is uploaded to an information processing apparatus server over a network, with printing carried out on the server side (see, for example, Japanese Patent Application Laid-Open No. 2006-072850).

If the edited data is data of a type that multiple people wish to have, for example a graduation album or the like, then printing may be ordered as follows: Specifically, people other than the original editor can only order the same edited data that the original editor created. This edited data is not always what people other than the original editor want, and consequently, there is a desire for people other than the original editor to be able to further edit such edited data as they wish.

However, to make it possible for all people to download edited data created by the original editor and edit it using an application on the client side means that there is a possibility that the data will be edited beyond the intent of the original editor, which is not appropriate. In addition, there is the opportunity for people other than the original editor to directly touch the data, leading to the problem of tampering.

It should be noted that with data creation other than that targeted for printing as described above, for example with the display of a greeting card as a web page and the sending of that URL as an e-mail to a third party, in the creation of the data the same problems arise.

SUMMARY OF THE INVENTION

The present invention has been made in consideration of the above situation, and has as its multimedia object to make it possible for a third party to edit only certain objects among album data provided to a server, and further, to prevent modifying, changing or tampering with the data beyond the intent of the original editor.

Another object of the present invention is to enable an admitted subscriber to edit objects on a server provided by an original editor simply.

According to the present invention, the foregoing object is obtained by providing an electronic album creating apparatus for forming multimedia objects into album data comprising: an object instruction unit that instructs an allowed object that allows editing from among a plurality of multimedia objects that form album data; an editing content instruction unit that instructs content type of editing allowed for the allowed object; a storage unit that stores the album data after adding to the album data editing information that indicates the allowed object and editing content type for the allowed object; and an uploading unit that uploads the album data stored in the storage unit to a server device over a network.

According to the present invention, the foregoing object is also obtained by providing an electronic album editing apparatus that conducts editing of album data including a plurality of multimedia objects comprising: an identification unit that identifies each the multimedia object as editable or not from editing information previously embedded in the album data; a determination unit that determines the multimedia object identified as editable and its allowed editing content type; a generation unit that generates an editing screen including display of the editing locations; and an acquisition unit that acquires editing content type from an editing operation performed in the editing screen, wherein the generation unit generating the editing screen including display of the multimedia objects for the editing content or the editing content of the objects.

Further, according to the present invention, the foregoing object is also obtained by providing an information processing system comprising a first information processing apparatus and a second information processing apparatus, the first information processing apparatus comprising: an object instruction unit that instructs an allowed object that allows editing from among a plurality of multimedia objects that form album data; an editing content instruction unit that instructs content type of editing allowed for the allowed object; a storage unit that stores the album data after adding to the album data editing information that indicates the allowed object and editing content type for the allowed object; and an up-loading unit that uploads the album data stored in the storage unit to a server device over a network, the second information processing apparatus that downloads from the server device the album data uploaded by the up-loading unit and conducts editing of the album data comprising: an identification unit that identifies each the multimedia object as editable or not from editing information previously embedded in the album data; a determination unit that determines the multimedia object identified as editable and its allowed editing content type; a generation unit that generates an editing screen including display of the editing locations; and an acquisition unit that acquires editing content type from an editing operation performed in the editing screen, wherein the generation unit generating the editing screen including display of the multimedia objects for the editing content or the editing content of the objects.

Furthermore, according to the present invention, the foregoing object is also obtained by providing an electronic album creating method in an information processing apparatus that forms multimedia objects into album data comprising: instructing an allowed object that allows editing from among a plurality of multimedia objects that form album data; instructing content type of editing allowed for the allowed object; adding to the album data editing information that indicates the allowed object and editing content type for the allowed object; and storing the album data to which the editing information is added in a storage unit: and uploading the album data stored by the storage unit to a server device over a network.

Further, according to the present invention, the foregoing object is also obtained by providing an electronic album editing method in an information processing apparatus that conducts editing of album data including a plurality of multimedia objects, the method comprising: identifying each the multimedia object as editable or not from editing information previously embedded in the album data; determining the multimedia object identified as editable and its allowed editing content type; generating an editing screen including display of the editing locations; and acquiring editing content type from an editing operation performed in the editing screen, wherein the generating step generating the editing screen including display of the multimedia objects for the editing content or the editing content of the objects.

Further, according to the present invention, the foregoing object is also obtained by providing a storage medium readable by an information processing apparatus, the storage medium storing a program which is executable by the information processing apparatus and comprises program codes realizing either of the electronic album editing methods as described above.

Further features of the present invention will become apparent from the following description of exemplary embodiments (with reference to the attached drawings).

BRIEF DESCRIPTION OF THE DRAWINGS

FIG. 2 is a diagram illustrating a system and an operating procedure of processes performed by an information processing apparatus according to a first embodiment of the present invention;

FIGS. 3A and 3B are diagrams showing editing setting menus on an application used in the image forming apparatus according to the first embodiment of the present invention;

FIG. 5 is a diagram illustrating a method of embedding editing information on an application used in the information processing apparatus according to the first embodiment of the present invention;

FIG. 12 is a diagram showing a Web page for an admitted subscriber to enter an admitted subscriber's address and name, and a shipping address and name, in the information processing apparatus according to the first embodiment of the present invention;

FIG. 13 is a diagram showing a Web page for an admitted subscriber to confirm order contents in the information processing apparatus according to the first embodiment of the present invention;

FIG. 18 is a diagram illustrating a method of embedding editing information on an application used in the information processing apparatus according to the second embodiment of the present invention;

FIG. 20 is a diagram showing a Web page for an admitted subscriber to carry out replacement of an album data images in the information processing apparatus according to the second embodiment of the present invention;

FIG. 28 is a diagram showing a Web page for an admitted subscriber to carry out editing of album data in the information processing apparatus according to the second embodiment of the present invention;

FIGS. 32A and 32B are flow charts illustrating operations in a process of displaying a variable-length Web page for an admitted subscriber to edit album data in the information processing apparatus according to the second embodiment of the present invention.

DESCRIPTION OF THE EMBODIMENTS

Preferred embodiments of the present invention will be described in detail in accordance with the accompanying drawings.

Configuration Example

Figure 1:
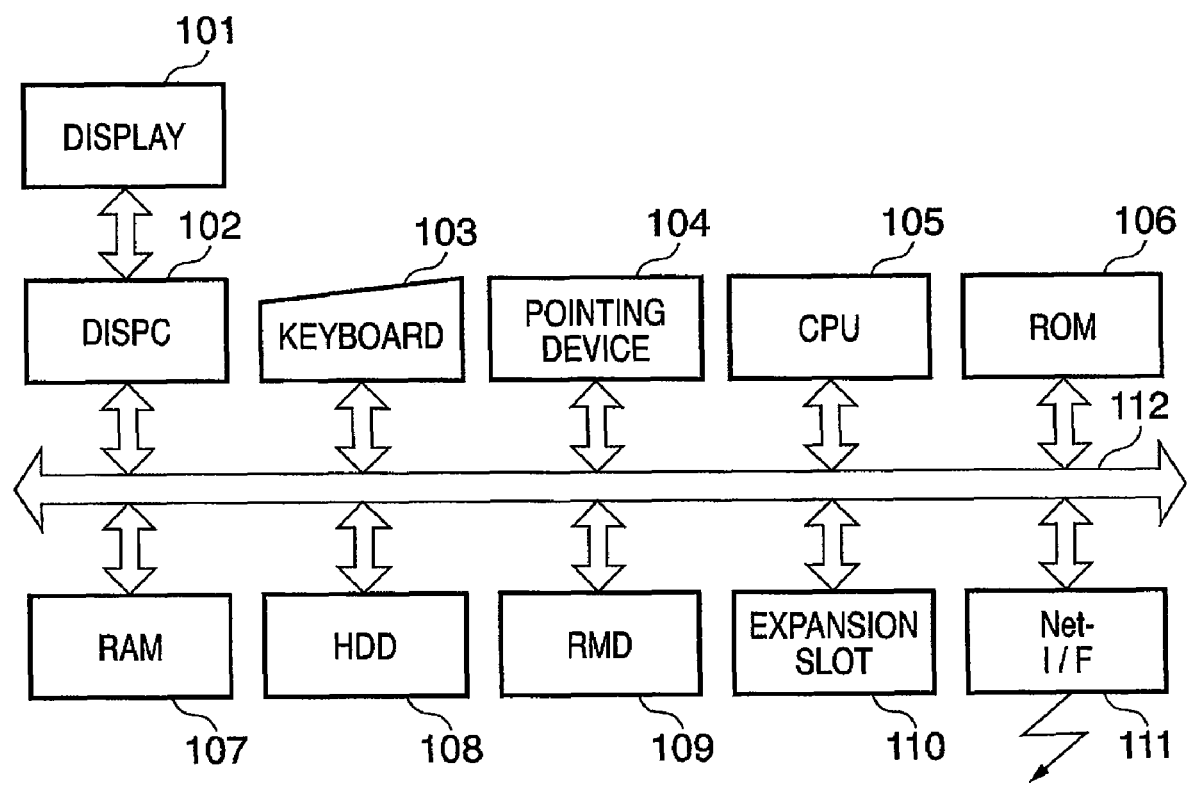
FIG. 1 is a block diagram showing a configuration of a computer apparatus that can be used as a Web server and client in an information processing apparatus according to embodiments of the present invention.

A description is now given of an information processing system adapting an information processing apparatus according to preferred embodiments of the present invention, with reference to the appended drawings, in which FIG. 1 is a block diagram showing a basic configuration of the information processing apparatus according to embodiments of the present invention.

The information processing apparatus shown in FIG. 1 is a computer apparatus that executes applications of the embodiments of the present invention, used on a server apparatus (hereinafter "server") side and a client terminal apparatus (hereinafter "client") side.

In FIG. 1, a display 101 displays data information being processed by application programs, a variety of message menus, and so forth. The display 101 is comprised of a CRT (Cathode Ray Tube), LCD (Liquid Crystal Display), or the like. A DISPC 102 as a video RAM (VRAM) display controller controls screen display to the display 101. A keyboard 103 and a pointing device 104 are used to enter text and instruct icons and buttons in a GUI (Graphical User Interface). A CPU 105 controls the computer apparatus shown in FIG. 1 as a whole.

A ROM (Read Only Memory) 106 stores programs that the CPU 105 executes, parameters, and so forth. A RAM (Random Access Memory) 107 is used as a work area when the CPU 105 executes various programs, as a temporary back-up area during error processing, and so on.

A hard disk drive (HDD) 108 and a removable media drive (RMD) 109 function as external storage devices. The removable media drive (RMD) 109 is an apparatus that writes to and reads from a detachable recording medium. The removable media drive (RMD) 109 may be a floppy disk drive, an optical disk drive, a magneto-optical disk drive, or a memory card reader, as well as a removable HDD.

It should be noted that, starting with the programs that implement the various functions of the server and the client described in the present embodiment, the OS, Web browser and other application programs, data, libraries and the like are stored in at least one of the storage media described above depending on its application.

An expansion slot 110 is, for example, an expansion card installation slot that conforms to a PCI (Peripheral Component Interconnect) bus standard. Here, a variety of expansion boards such as a video capture board, sound board, GPIB board and the like can be installed.

A network interface 111 is an interface for connecting the computer apparatus to a computer network. A bus 112 is composed of an address bus, a data bus, and a control bus, and connects the units described above to each other. Moreover, in addition to the network interface 111, the information processing apparatus has a serial interface such as an RS-232C, RS-422, USB (Universal Serial Bus), IEEE 1394 or the like. Further, the information processing apparatus has a parallel interface such as an IEEE 1284, to enable connection to a modem, printer, or other external device.

(First Embodiment)
(System Outline)

FIG. 2 is an overall view of an information processing system adapting the information processing apparatus according to a first embodiment of the present invention. As can be understood from FIG. 2, a printing may be performed outside the information processing system described here. In addition, data created in this first embodiment is not limited to album data. Although identical when drawings or the like are created with the same method as that of the information processing system adapting the first embodiment, the term data is vague. Therefore, in this specification, the object of the information processing system adapting the first embodiment is printing, and the data is data edited for the purpose of printing created data as an album (hereinafter "album data"). However, it is to be understood that the present invention is not limited to the process of creating album data, and album data is simply used as one example in the description in order to facilitate the understanding of the information processing system adapting the first embodiment of the present invention.

First, a description is given of the overall flow of operations in the information processing system adapting the information processing apparatus according to the first embodiment of the present invention, using FIG. 2.

As shown in step (1) in FIG. 2, first, an original album editor, using an application installed in a personal computer 121 (hereinafter PC 121) on the client side creates album data. In this case, the original album editor edits data of various multimedia objects such as images and text that he or she possesses using the application and creates album data. Next, as shown in step (2), the original album editor, using the PC 121, selects one of the objects that form the edited album data and sets that object as an allowed object that is allowed to be edited. Where the original editor wishes to limit to type/types of editing of the object to be allowed, the original album editor also sets the type of editing content. If there is also another object or objects that the original album editor wishes to set as objects for which editing is allowed, then the original album editor similarly sets that object or objects as allowed objects.

Next, as shown in step (3), when the original album editor clicks the application upload button, album data is uploaded to a server 122 together with information relating to allowance of editing. The server 122, as shown in step (4), stores the uploaded album data in a data storage device 124. The data storage device 124 is a storage device with a very large storage capacity, and may be configured separately from the server 122.

Once storage of the album data in the data storage device 124 is finished, as shown in step (5) a URL for the application installed in the PC 121 is provided to the PC 121 from the server 122. The application installed in the PC 121 then opens a Web browser and displays the URL thus provided.

Next, as shown in step (6), the original album editor enters the e-mail address of an admitted subscriber allowed to view, edit, and order the album data through a Web browser, and clicks an OK button. In the following description, such a user, including also the person who actually orders, is referred to as an admitted subscriber. In step (7) shown in FIG. 2, an e-mail providing a Web page URL where the contents of the uploaded album data can be checked is sent to the admitted subscriber e-mail address that the original album editor instructed. More than one URL to the album data may be provided in the e-mail.

The admitted subscriber, having received the e-mail described above, as shown in step (8), using a personal computer 123 (hereinafter PC 123), selects the URL contained in the e-mail, enters it into the Web browser, displays the contents of the album data and checks it, and downloads the album data. Then, as shown in step (9), in accordance with operations carried out by the admitted subscriber, the PC 123 edits the objects in accordance with the allowed editing content. If the editing content pertains to text, then, for example, in the case of instructing the text, changing the size of the font or the font name, and so forth, these actions are carried out by selecting from a menu or the like. If the editing content pertains to replacing images, then new image data is also uploaded to the server 122. In the case of image replacement, although the image needs to be trimmed to fit the positions in which the image data is arranged inside the album data and the image data size, an area to be trimmed may be set automatically, at, for example, a center of a frame positioned at a center of the image data, or an area to be trimmed may be instructed in accordance with the admitted subscriber's instruction.

After the admitted subscriber finishes editing the object using the PC 123, the admitted subscriber clicks the OK button. When that happens, as shown in step (10), the PC 123 generates album data that reflects the results of the editing and provides a preview thereof on the display. The admitted subscriber then checks the edited album data using the preview. If further editing is required, then the PC 123 returns to step (9). If no further editing is required, then the PC 123 uploads the edited album data to the server 122. Next, an input screen for entering the number of printed copies is displayed on the Web browser of the PC 123 of the admitted subscriber, in accordance with a request to input order information from the server 122.

Here, once the admitted subscriber inputs the number of printed copies and clicks the OK button, a screen for entering the admitted subscriber and a shipping address is displayed. The admitted subscriber enters the name of the admitted subscriber and the shipping address information in the Web browser of the PC 123 and clicks the OK button. The PC 123 then uploads order information including the number of printed copies, the name of the admitted subscriber, the shipping address information and the like to the server 122. The server 122, based on the order information, calculates the cost of printing the album data and transmits the calculation results to the PC 123. The PC 123 displays on the display an estimate screen for displaying the cost according to the information from the server 122.

Here, as shown in step (11), when the admitted subscriber clicks the OK button on the estimate screen, the PC 123 uploads an order instruction to the server 122 and the server 122 generates an invoice for the cost of printing. Then, as shown in step (12), the server 122 provides an order number and information relating to the invoice to the PC 123 of the admitted subscriber. Further, in step (12), when payment has been confirmed or payment by C.O.D. or the like is certain, the server 122 in step (13) instructs a printing apparatus 125 to print the edited album data. Next, a detailed description is given of the steps shown in FIG. 2.

(Operations Performed by the Original Album Editor and the Corresponding Processes (1))

The creation of album data in step (1) shown in FIG. 2 is accomplished by arranging and rendering images, drawings, text and other such objects using a GUI as is done with Adobe Illustrator®, Quark XPress® and the like. Then, the GUI thus used has the interfaces similar to the interfaces that these types of applications have. How objects are arranged, how drawings are rendered and arranged, how text is entered and arranged, how font is instructed and so forth, are not essential to the present invention.

In order to make allowable the editing of step (2) in FIG. 2, it is necessary that the GUI enable the selection of the images, drawings, texts and other objects. However, that is the only restriction, and moreover, this restriction is the prerequisite for arrangement and rendering by the GUI, and is a general one. It should be noted that the types of applications noted above may for example be distributed to people having right of access to the server 122. Then, the person to whom the application is distributed installs the application on his or her own PC. A person so installing then becomes an original album editor, but that in itself imposes no restriction on the applications whatsoever.

By contrast, a person to whom an e-mail is sent in step (7) in FIG. 2, that is, an admitted subscriber allowed to edit, can also download an application for the purpose of editing the album data using a link in a Web page that enables the contents of the album data to be checked that is specified in the e-mail or using a separate URL in the e-mail. The application may be limited its functions to less than those which the original album editor uses so that the application enables editing only, and the admitted subscriber cannot create album data from scratch (that is, so that the admitted subscriber cannot become an original album editor). Further, the application may be arranged so that, even though the application has the same functions as those which the original album editor uses, the creation of new album data is only enabled when authentication is obtained on the server 122 side. Additionally, matters may be arranged so that anyone can download the application, without limiting access to the server 122.

In step (2) in FIG. 2, the original album editor selects a specific object and displays a menu by mouse click (as in FIG. 3A) or by menu display from a menu bar (FIG. 3B).

Figure 4:
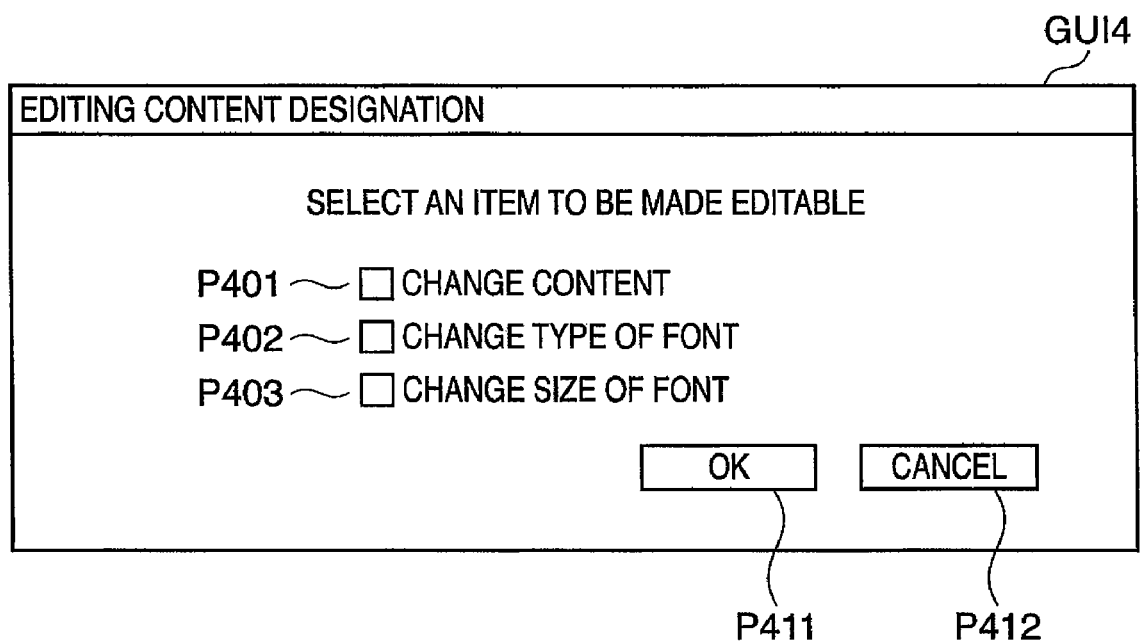
FIG. 4 is a diagram showing an interface to instruct editing content on an application used in the information processing apparatus according to the first embodiment of the present invention.

Now assume that the original album editor selects "edit . . . " (P301 or P311) in FIG. 3A or FIG. 3B. Once that happens, a window is displayed for the original album editor to select editable editing content. FIG. 4 shows a GUI 4 that is one example of a GUI (Graphic User Interface) screen in a case in which the selected object is text. Here, it is possible to check in a check-box for any of a text content revision (P401), a font type revision (P402), and a font size revision (P403). After checking a box and clicking an OK button P411, the selected object becomes editable as an allowed object, for which settable editing content is instructed when editing. When a cancel button P412 is clicked, the edit setting of the selected object is not changed. It should be noted that, when the selected object is already editable and it is desired to change the setting so that editing cannot be carried out, such change can be effected by selecting the menu P302 or the menu P312 shown in FIG. 3A or FIG. 3B.

Data Structure Example

If the format of the album data that the application generates is expressible in terms of images, test, drawings or the like, then the type of format or the language is unimportant. In the present embodiment, the format of the album data that the application generates is PDF (Adobe Portable Document Format®. PDF is a highly compatible, general-purpose format capable of expressing images, text, or drawings, the use of which in the description of the present invention is not required but is done solely for convenience of explication, and is not intended to limit the present invention.

For example, with drawings, there are instances in which they need not be freely edited by the admitted subscriber or there is no need for them in the first place. In these sorts of instances, a general-purpose format like PDF is not necessary, and therefore a markup language like HTML (Hyper Text Markup Language) may be used. Moreover, it is also possible to use other general-purpose formats or languages, such as Adobe PostScript® or a PDL (Page Description Language) like Scalable Vector Graphics. Further, it goes without saying that special-purpose formats and languages may be used in place of these commonly used formats and languages.

When creating album data using an application, an image is expressed as shown by a1 in FIG. 5, text as shown by b1 in FIG. 5, and drawings as by c1 in FIG. 5. It should be noted that "100 0 0 100 0 0 cm/R6 Do" means that object R6 is located at coordinates (100, 100). Object R6 is described by a3. For example, in a3, that object R6 is an image is known from a value set in the /SubType, as is the fact that the image has a width of 640 bits and a height of 480 bits. In addition, although omitted from FIG. 5, in actuality, information for rendering the image is described at and below stream.

Then, when the original album editor makes these images, text, drawings and the like editable, it is indicated that these items are editable by adding an /Editable key to their respective dictionaries.

a2, b2, and c2 in FIG. 5 show cases in which a1,b1, and c1 in FIG. 5 are made editable. A dictionary is instructed as the value for the /Editable key, and in that dictionary is included a /Type key, an /Id key, and respective values therefor. The value for the /Type key indicates the type of editing allowed, and is expressed as an arrangement in which a plurality of types of instructions is possible. In the case of images, when /Type is 1 the image can be replaced, when /Type is 2 the image position can be changed, and when /Type is 3 the image magnification can be changed. In the case of text, when /Type is 1 text is instructed. Further, when /Type is 2 the size of the font can be changed, and when the /Type is 3 the font itself can be changed. In the case of drawings, when /Type is 1 revision of the position is allowed. Specifically, in the case of a2 in FIG. 5, the image may be replaced, the image position maybe changed, and the image magnification may be changed; in the case of b2 in FIG. 5, text may be instructed, the size of the font may be changed, and the font may be changed; in the case of c2 in FIG. 5, the position of the drawing may be revised.

It should be noted that an editing method in which it is desired to allow editing by admitted subscribers (step (9) in FIG. 2) is not limited to that described above, and therefore the values set in /Type may be defined as convenient. Additionally, it should be noted that a1 and a2 in FIG. 5 use externally defined image XObject, and therefore describe a3 in FIG. 5.

Further, a number or a character sequence required to identify an allowed object that is allowed to be edited is used for the value for /Id key. Thus, for example, a value that is uniquely determined from the PDF object byte number, object number, and the like is used. This value is, for example, determined by the product of multiplying the sum of the object size and the object number by a particular number, or by the remainder of dividing the sum of the object size and the object number by a particular number, or the like. Addition of the /Id key and its corresponding value as described above enables the application to easily determine whether or not the value for the /Id key is correct when an admitted subscriber edits, which makes it possible to prevent the admitted subscriber from editing a given location. The need to render it impossible to rewrite a file arises because the PDF itself is downloaded.

At the same time, the /Editable key is also added to the PDF catalog object as well. Then, a dictionary is instructed as the value for the /Editable key. In that dictionary is included a /Type key, an /ID key, and respective values therefor (d1 in FIG. 5). The value for the /Type key is either /All, /Specified, or /Complete, with /A1 indicating that all the objects can be revised, and further, /Specified indicating that only objects in which the /Editable key is included can be revised, with /Complete indicating that revision is not possible.

In addition, it is the same with the /Id key for objects therein, and thus the application checks to see if the values for the /Id key are correct, thereby preventing the admitted subscriber from editing a given location when the admitted subscriber edits.

Assume that the original album editor, using the application, creates album data, and before uploading the created album data, member registration with the server 122 is required in advance. In such a case, although not required it is permissible to include a /User key, a /File key, and their respective values as values for the catalog object /Editable key ((d2) in FIG. 5). As the value for the /User key a number assigned by the server 122 to each original album editor (hereinafter referred to as an original album editor ID) is encrypted by one method or another. By contrast, as the value for the /File key, the original album editor uploads album data. Then, when the server 122 saves the album data in a data storage area, a number assigned to each piece of album data (hereinafter referred to as an album data ID) is encrypted by one method or another.

The server 122 decrypts by an appropriate method the respective values for the /User key and the /File key contained in the album data that is uploaded. Then, it is determined whether or not the original album editor identified by the album data ID that is obtained from the value for the /File is the original album editor identified by the original album editor ID that is obtained from the value for the /User key, which enables it to be known if the album data edited by the admitted subscriber is album data properly uploaded by a properly registered original album editor. In the event that the album data edited is not album data properly uploaded by a properly registered original album editor, or the respective values for the /User key and the /File key could not be decrypted by an appropriate method, then the following occurs: Specifically, upload by the original album editor is refused and the remaining processes are not carried out. It should be noted that in order to conduct a check to determine if the album data has been properly uploaded, it is presumed that one of the following three states has been affirmative in advance.

α1: When the original album editors carry out member registration in advance, an original album editor ID is assigned to each original album editor and stored in a database. A login authentication process is carried out when the original album editor uploads album data, and at that time the original album editor ID and information bundled with the original album editor ID, as well as a password added to the original album editor ID, are utilized.

α2: The original album editor uploads the album data and the server 122 assigns an album data ID number to each piece of album data. When the album data is saved in a file system or in the database, which is a data storage area, information associating the actual storage place with the album data ID is kept in the database. The actual storage place in the case of a database is a stored table record master key, and in the case of a file system it is a file path.

α3: Information associating the album data ID with the original album editor ID in the database is also kept in the database.

In addition, one or the other of the /User key and the value for it or the /File key and the value for it are effective for determining whether or not the album data is valid album data. With the /User key, it can be determined if the original album editor identified by the original album editor ID obtained from the value for the /User key is not registered in the database. With the /File key, it can be determined if the album data identified by the album data ID obtained from the value for the /File key is not registered in the database. When only the /User key and its value are included, only α1 is a prerequisite. When only the /File key and its value are included, only α2 is a prerequisite.

(Operations Performed by the Original Album Editor and the Corresponding Processes (2))

Figure 6:
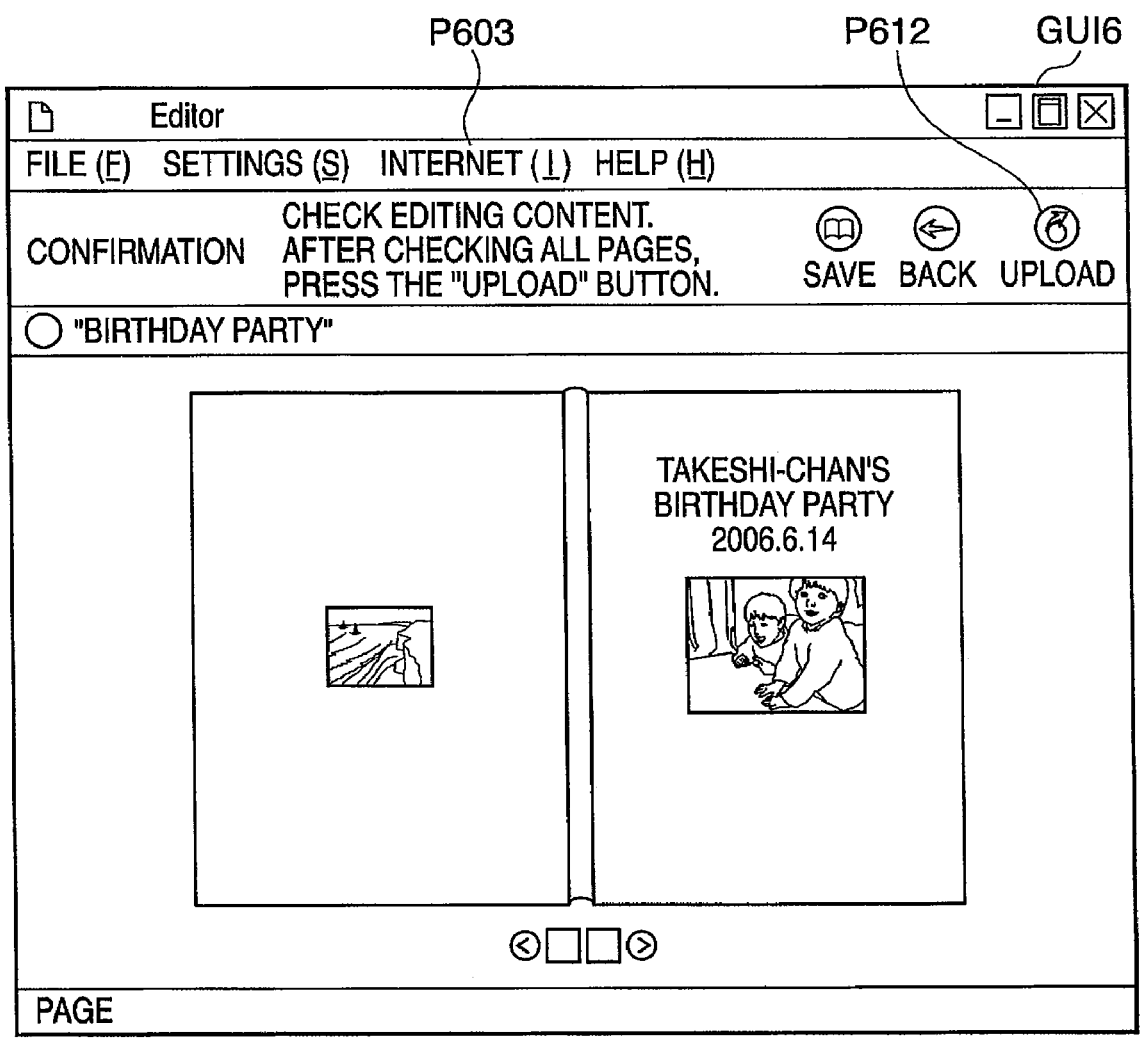
FIG. 6 is a diagram showing a Web page used when uploading to a server from an application that an original album editor uses in the information processing apparatus according to the first embodiment of the present invention.

The original album editor, having created the album data and finished setting its editing, and after checking the album data, uploads the album data to the server 122 (step (3) in FIG. 2). FIG. 6 shows one example of a GUI 6 for checking the album data in an application. The original album editor checks the album data on the PC 121. If it is determined that there is no problem with the album data, the original album editor clicks an upload button P612 or selects an upload menu from an Internet menu P603. Once that happens, the application uploads the album data to the server 122.

When the album data is uploaded to the server 122, the application sets the value for the /Type key included in the dictionary that is the value for the /Editable key of the catalog object to /Specified. Then, in response thereto, the value for the /Id key also changes. In other words, only an allowed object in which the /Editable key is included can be revised. It should be noted that, when the original album editor saves the album data created with the application on a local disk, the value for the /Type key is /A1. In other words, all objects can be revised as allowed objects.

The URL uploaded at this time is a URL for the purpose of enabling the original album editor to upload, and may be embedded in the application as a constant or acquired by querying a URL identified by the server 122 prior to upload.

Then, the server 122 saves the album data to a data storage device 124 (step (4) in FIG. 2). Where member registration is required in order to utilize the server 122, it is necessary to register as a member in advance and to conduct a member authentication process when uploading. However, these processes are not essential to the present embodiment, and a description thereof shall be omitted here.

The server 122, once the saving of the album data in the data storage device 124 is successful, provides a URL of a GUI screen that is a Web page used to instruct admitted subscribers to the application of the PC 121 (step (5) in FIG. 2). The application then opens its default Web browser and displays the provided URL (step (6) in FIG. 2 , FIG. 7).

Figure 7:
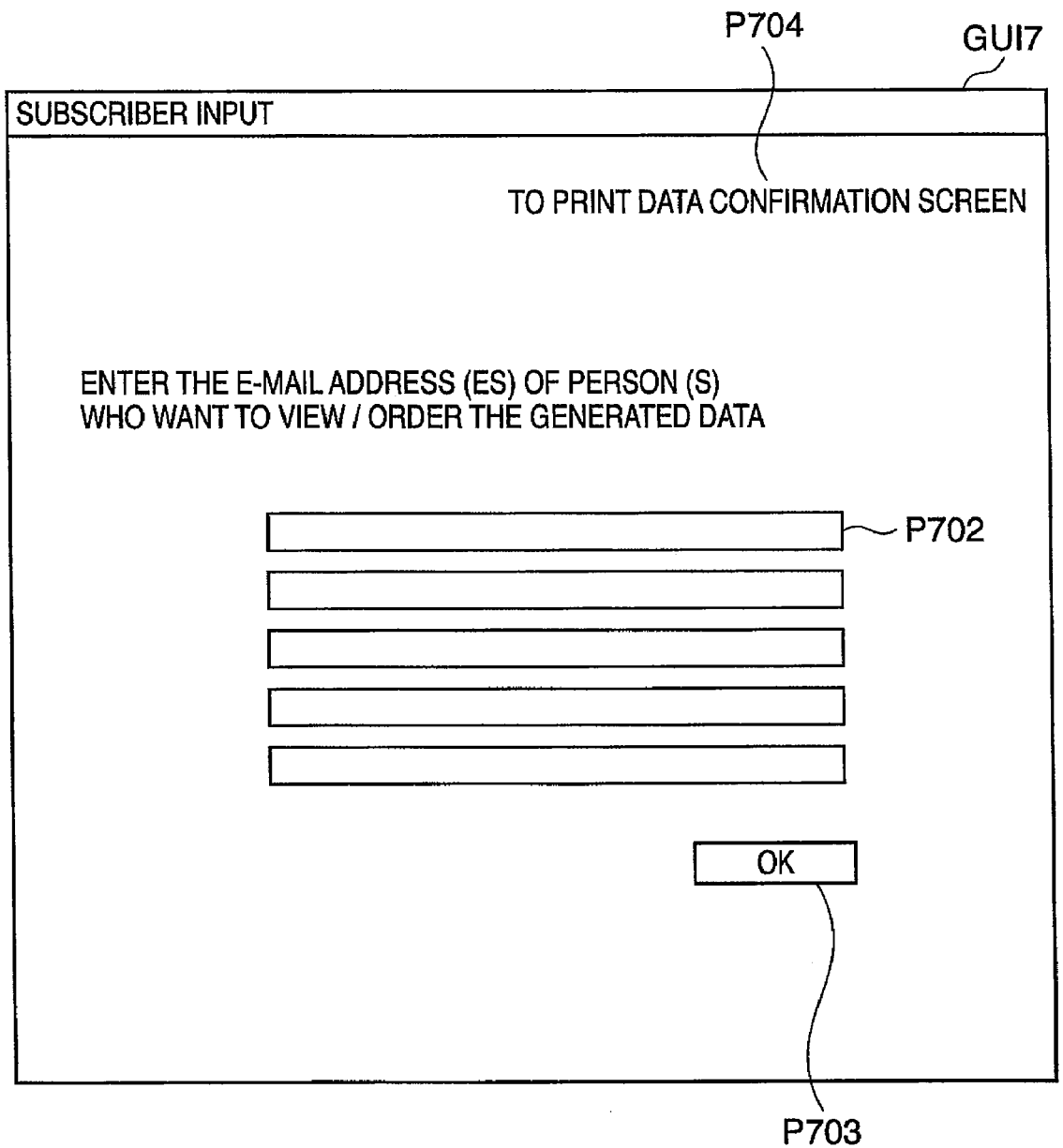
FIG. 7 is a diagram showing a Web page to instruct an e-mail address of an admitted subscriber after the original album editor uploads in the information processing apparatus according to the first embodiment of the present invention.
Figure 8:
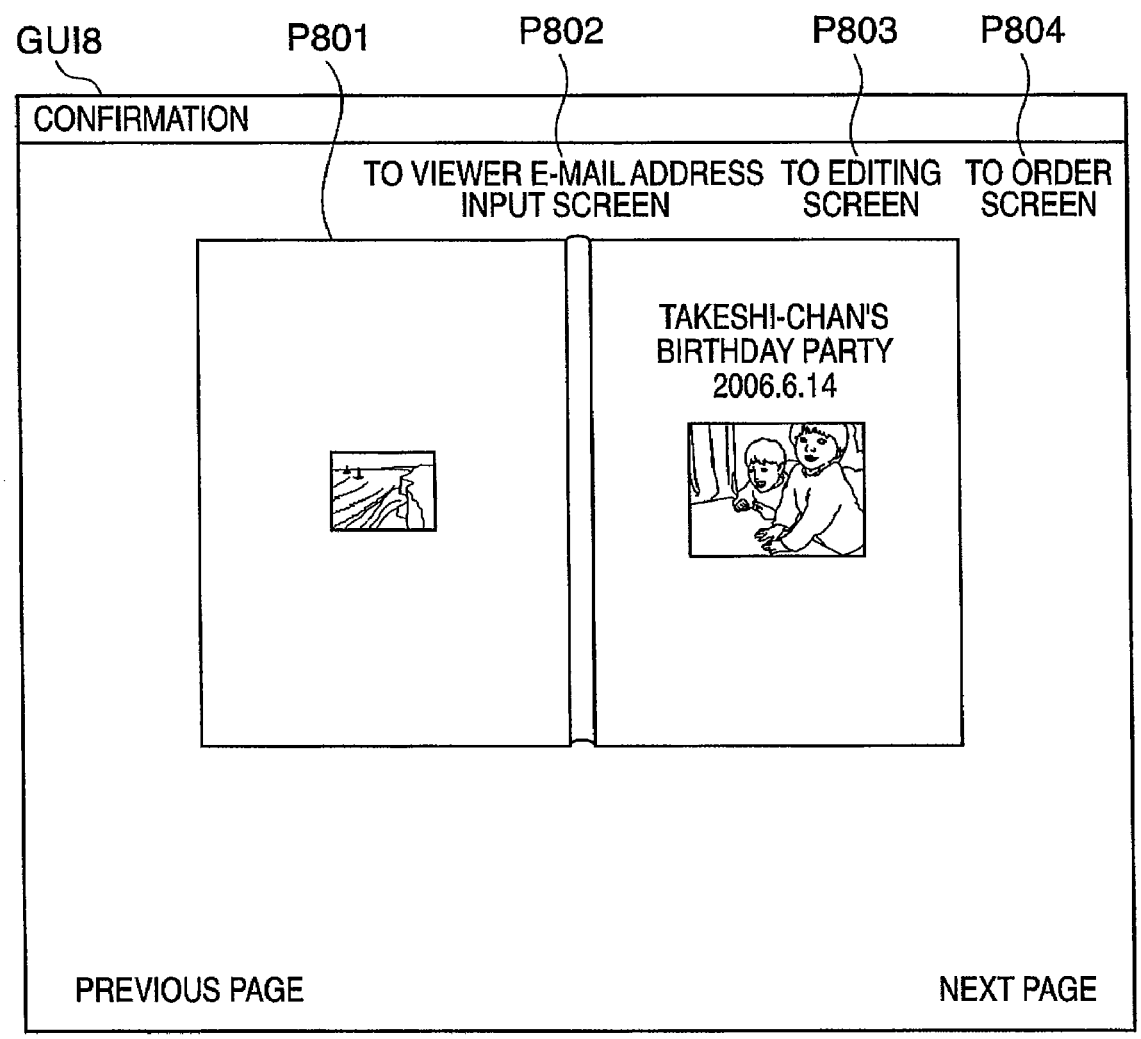
FIG. 8 is a diagram showing a Web page to carry out confirmation of album data after the original album editor uploads in the information processing apparatus according to the first embodiment of the present invention.

Using the GUI 7 shown in FIG. 7, the original album editor enters the e-mail address(es) of the admitted subscriber(s) in the text field P702 and clicks an OK button P703. If the original album editor wishes to check the contents of the uploaded album data, he or she clicks a link P704, shifting to a GUI 8 of a screen for confirming the album data (FIG. 8). On the GUI 8 screen, the album data is converted into JPEG data or the like and displayed (P801), which enables the contents of the album data to be checked. A link P802 for shifting to the GUI 7 is provided in the GUI 8, thereby enabling the e-mail address(es) of the admitted subscriber(s) to be set upon confirmation of the contents of the album data.

Figure 9:
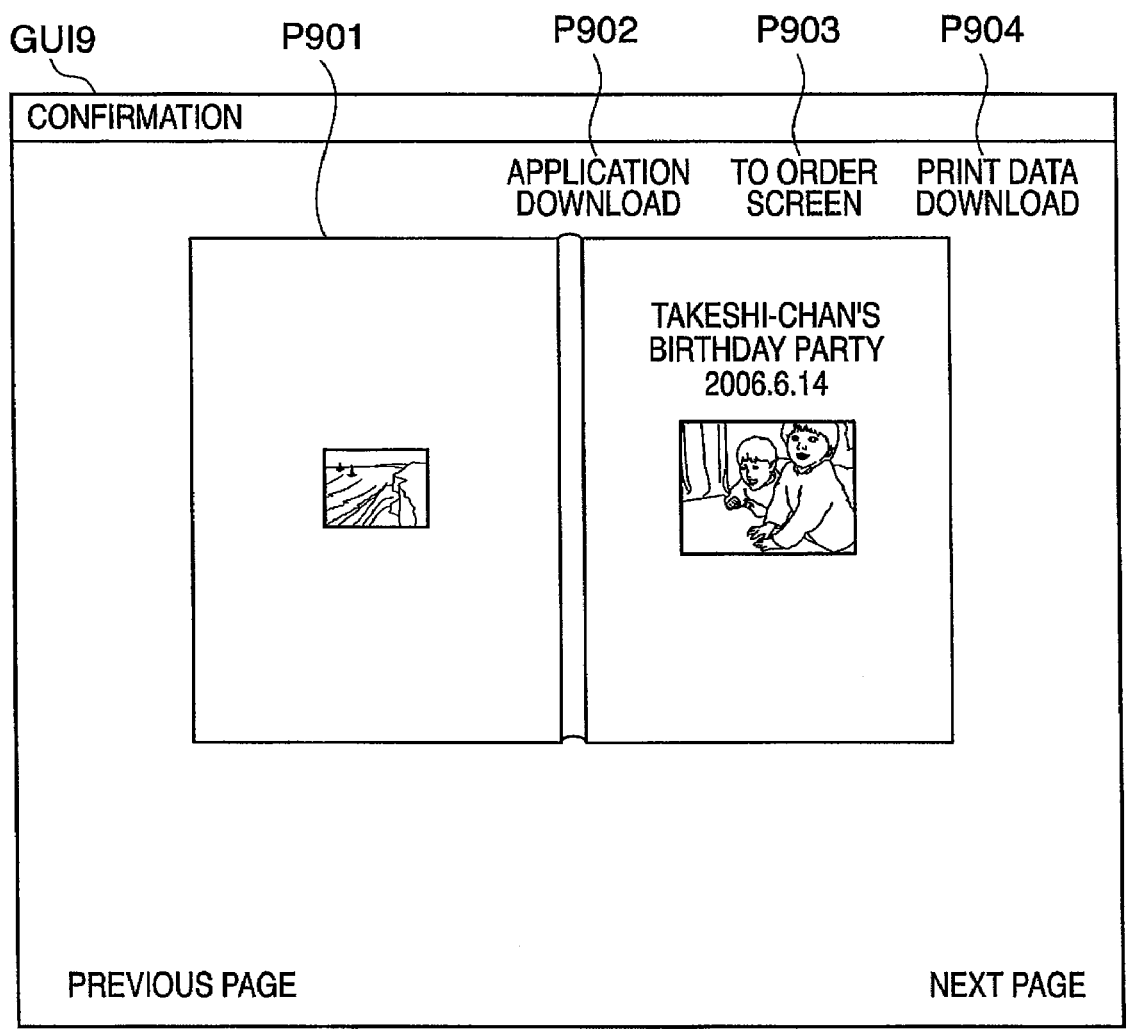
FIG. 9 is a diagram showing a Web page for an admitted subscriber to download album data in the information processing apparatus according to the first embodiment of the present invention.
Figure 10:
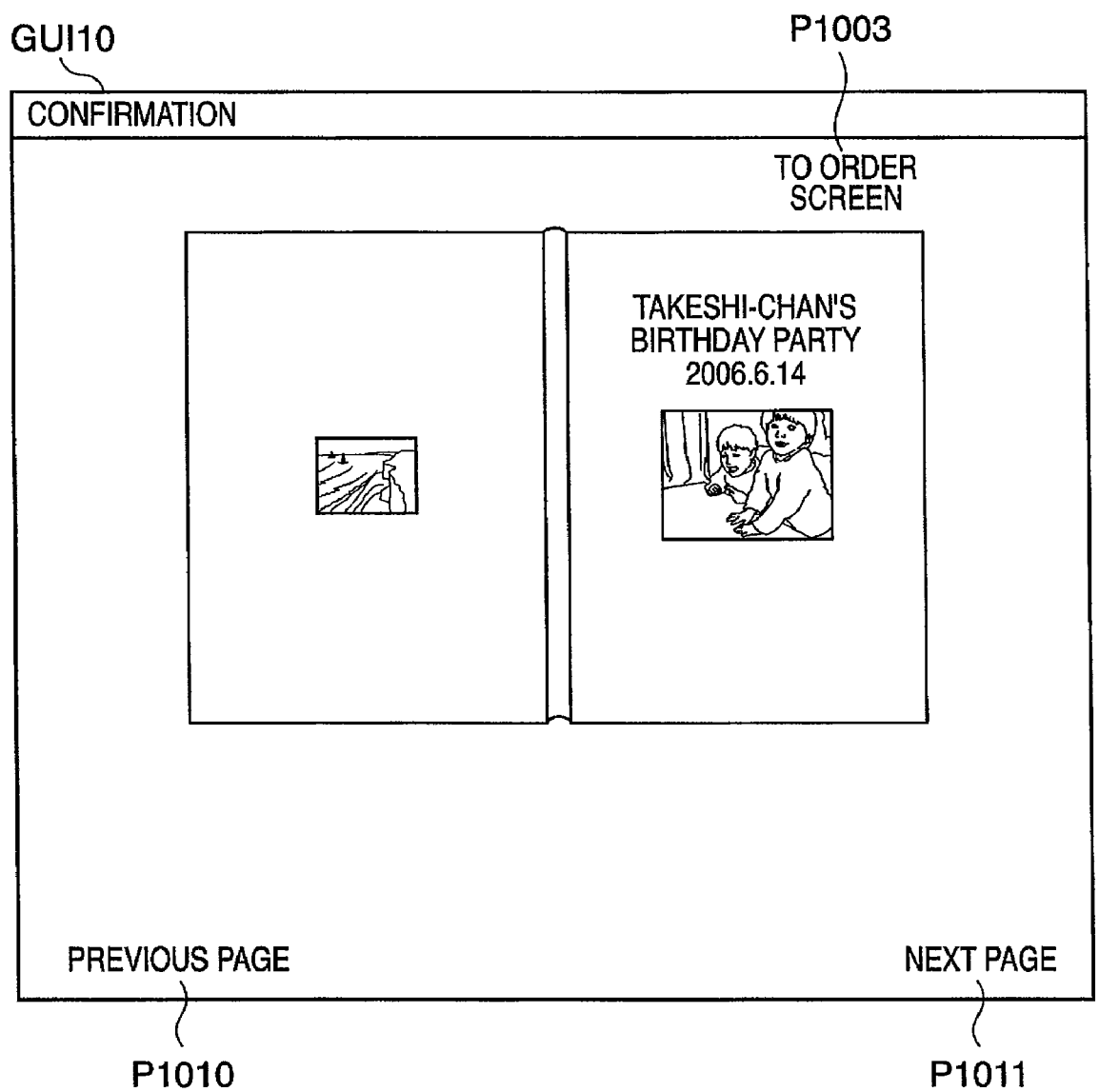
FIG. 10 is a diagram showing a Web page for an admitted subscriber to confirm album data in the information processing apparatus according to the first embodiment of the present invention.

In addition, the original album editor as well can edit as an admitted subscriber by clicking a button P803, and can order as an admitted subscriber by clicking a button P804 also. These processes differ from processing for an admitted subscriber who has received notice from the original album editor only in that the screen that appears after editing or ordering is finished or the cancel button is clicked is not a GUI 9 shown in FIG. 9 but the GUI 8. The rest is not different, however, and is described in detail later.

In FIG. 7, a click of the OK button P703 generates a request to the server 122. Upon receiving the request, the server 122 transmits the URL of the GUI 9 that is a Web page that allows the admitted subscriber to check the contents of the album data to the e-mail address of the admitted subscriber entered by the original album editor (step (7) in FIG. 2).

(Operations Performed by the Admitted Subscriber and the Corresponding Processes)

The admitted subscriber enters the URL in the Web browser which then displays the Web page acquired from the server 122, enabling the admitted subscriber to view the GUI 9 for checking the content of the album data and for downloading an application and the album data (step (8) in FIG. 2, FIG. 8). When the admitted subscriber's PC 123 enters the URL provided by e-mail in the Web browser and attempts to display the Web page, the server 122 generates JPEG data from the album data and downloads it to the PC 123 as a preview image that is displayed (P901). Prior to generating the preview image JPEG date from the album data, the server 122 determines whether or not there are any objects in the target page in the album data that are set to editable by looking for the /Editable key described above, and if so, displays links P902, P904 on the GUI 9.

The admitted subscriber views the preview image and can place an order with the server 122 by clicking the link P903 when ordering printing of the album data as is.

There are portions that the original album editor allows the admitted subscriber to edit, and therefore the link P902 is displayed. However, assume that the admitted subscriber has not yet installed an editing application in the PC 123. In that case, by clicking the link P902 the PC 123 downloads the editing application from the server 122 and installs it. Then, the admitted subscriber clicks the link P904 and the PC 123 downloads the album data, and opens the downloaded data in the editing application.

Matters may be arranged so that, by providing an input area in which to enter a URL provided by e-mail in the editing application and the admitted subscriber entering that URL, the editing application downloads the album data from the server 122 and opens the downloaded album data.

The editing application, when it opens the album data, checks whether the value for the /Type key included in the dictionary that is the value for the /Editable key of the catalog object is /A1 or /Specified. When the value is anything other than /All or /Specified, the editing application displays an error message and stops processing. The editing application also determines whether or not the value for the /Id key included in the dictionary that is the value for the /Editable key of the catalog object is correct, and if not correct, displays an error message and stops processing.

Further, whether editing is allowed or not is determined by whether or not the /Editable key and a value for it exist within the object. At that time, it is also determined whether or not the value for the /Id key included in the dictionary for the /Editable key is correct. When the value for the /Id key is not correct, an error message is displayed and processing is stopped. Assume that the value for the /Type key is /All or /Specified, and further, that the values for the /Id key of the catalog object and the individual objects are correct. In such a case, the application opens the album data and the admitted subscriber can edit those portions that the original album editor has allowed to be edited (step (9) in FIG. 2).

In accordance with the editing application as described above, the PC 123 generates and displays an album data editing screen based on the results of checking the information relating to the allowance of editing of each object provided in the album data pages. At this point, the PC 123, as with the server 122 generating the GUIs shown in FIG. 20 to FIG. 30 described later, generates an editing screen so that only an operating portion for entering instructions for allowed objects and their editing content is displayed. Therefore, the admitted subscriber cannot carry out editing operations on the album data other than those that are permitted by the original editor.

Now assume that the value for the /Type key included in the dictionary that is the value for the /Editable key of the catalog object is /Specified. In addition, assume that there is an /Editable key and a value for it for all the objects and that the value for the /Id key included is also correct. In such a case, with respect to the editable range there is no difference whatsoever between this case and a case in which the value for the /Type key is /All. However, when the value for the /Type key is /Specified, the setting of the allowance of editing cannot be further carried out.

Moreover, assume that the editing application that the original album editor and the admitted subscriber use is the same. In such a case, depending on the value for the /Type key included in the dictionary that is the value for the /Editable key of the catalog object, it can be determined whether the user of the application is the original album editor or an admitted subscriber. In other words, when the value for the /Type key is /All the user of the application is determined to be the original album editor, and when the value for the /Type key is /Specified the user of the application is determined to be an admitted subscriber. When the application user is the original album editor, the URL uploaded from the application is the URL for enabling the original album editor to carry out an upload as described above. When the application user is an admitted subscriber, the URL is a URL for enabling the admitted subscriber to upload after editing, which is described later.

As with the creation of album data by the original album editor described above, the editing of album data is accomplished by arranging images, drawings, text and other such objects using a GUI as is done with Adobe Illustrator®, Quark XPress® and the like.

The admitted subscriber, having finished editing album data and after checking the album data, uploads the edited album data to the server 122. FIG. 6 shows an example of a screen for checking the album data in an editing application. Then, if the admitted subscriber determines that there is no problem with the edited album data, the admitted subscriber clicks the upload button P612 or selects an upload menu from the Internet menu P603. When that happens, the editing application of the PC 123 generates album data reflecting the editing results. At this time, the application sets the value for the /Type key included in the dictionary that is the value for the /Editable key of the catalog object to /Complete, in response to which the value for the /Id key changes as well. The admitted subscriber then uploads the edited album data to the serve 122.

At this point, the URL used for access for the purpose of this upload is the URL for enabling the admitted subscriber to upload after editing, and may be embedded in the editing application as a constant. Alternatively, prior to upload, the PC 123 may query a specific URL of the server 122 and acquire the URL. Further, the URL that the original album editor uses to upload and the URL that the admitted subscriber uses to upload after editing may be made the same. In such a case, assume that the value for the /Type key included in the dictionary that is the value for the /Editable key of the catalog object of the album data that is uploaded is /Specified. At this point, the upload is identified as an upload from the original album editor and the Web page GUI 7 is displayed. Alternatively, when the value is /Complete, the upload is identified as an upload from the admitted subscriber and the Web page GUI 10 may be displayed. It should be noted that each time a request is issued to this URL a session ID is issued by the server 122, and this session ID is retained even with later screen shifts.

The server 122 determines whether or not the value for the /Id key included in the dictionary that is the value for the /Editable key of the uploaded catalog object and the individual objects is correct. Then, when the value for the /Id key is not correct, the server 122 displays an alarm message and stops processing. Further, the /User key, the /File key, and the values for them are required as the value for the /Editable key of the catalog object. Where the prerequisites α1 through α3 described above are fulfilled, as described above, the server 122 checks whether the album data can be properly decrypted, whether the original album editor ID and the album data ID exist in the database, and whether the original album editor ID and the album data ID are associated with each other. Whenever the server 122 determines from this check that there is something wrong, it displays an alarm message and stops processing.

By contrast, when the server 122 determines from this check that everything is normal, it saves the uploaded album data as album data associated with the session ID and stores it in a separate place from the album data created by the original album editor. Then, by rendering the relevant page for this album data the server 122 generates JPEG data and displays the Web page GUI 10 so as to enable an admitted subscriber to check the contents. When the admitted subscriber uses links P1010, P1011, the server 122 displays the Web page GUI 10 either by generating JPEG data then and there or using previously generated JPEG data as preview images, thereby enabling the admitted subscriber to check the contents.

It should be noted that, in this first embodiment of the present invention, album data that the admitted subscriber edits is saved as album data associated with a session ID and stored in a separate place from the album data created by the original album editor. This is done in order to make it possible, when multiple admitted subscribers exist, to upload album data edited by each of these multiple admitted subscribers. Therefore, by associating the edited album data with a session ID and saving it the album data is only referenced as long as the session continues. Thus, once the session no longer continues it is necessary to delete the data.

In addition, instead of an ID that continues for only a short period of time like a session ID, an ID that continues for a long time period and is not reused may be issued. In such a case, such an ID may be saved on each individual admitted subscriber's PC 123 as Cookie information or clearly provided to each individual admitted subscriber, with the ID and the edited album data associated so as to enable re-ordering of edited album data.

Further, the URL provided to the admitted subscriber may be changed according to the e-mail address (and a password provided by a separate e-mail), and the admitted subscriber asked to enter the e-mail address (and the password provided separately) before checking the contents of the album data. Doing so makes possible an authentication process, as well as asking for entry of an e-mail address when uploading and saving album data that is the result of editing according to the registered e-mail address.

In addition, it is also possible to include an encrypted version of the admitted subscriber's e-mail address as a value for a /Mail key in the dictionary that is the value for the /Editable key of the catalog object and the individual objects. Then, by asking for the e-mail address to be entered when uploading, an authentication processes can be carried out (in the event of prior registration of the admitted subscriber, in place of the e-mail address it is also possible to use an ID or a character sequence obtained by encrypting the ID that identifies the admitted subscriber). Adopting such methods allows editing only to those who have been subjected to an authentication process, and makes it possible to save and to re-order album data that is the result of editing for each and every admitted subscriber.

Figure 11:
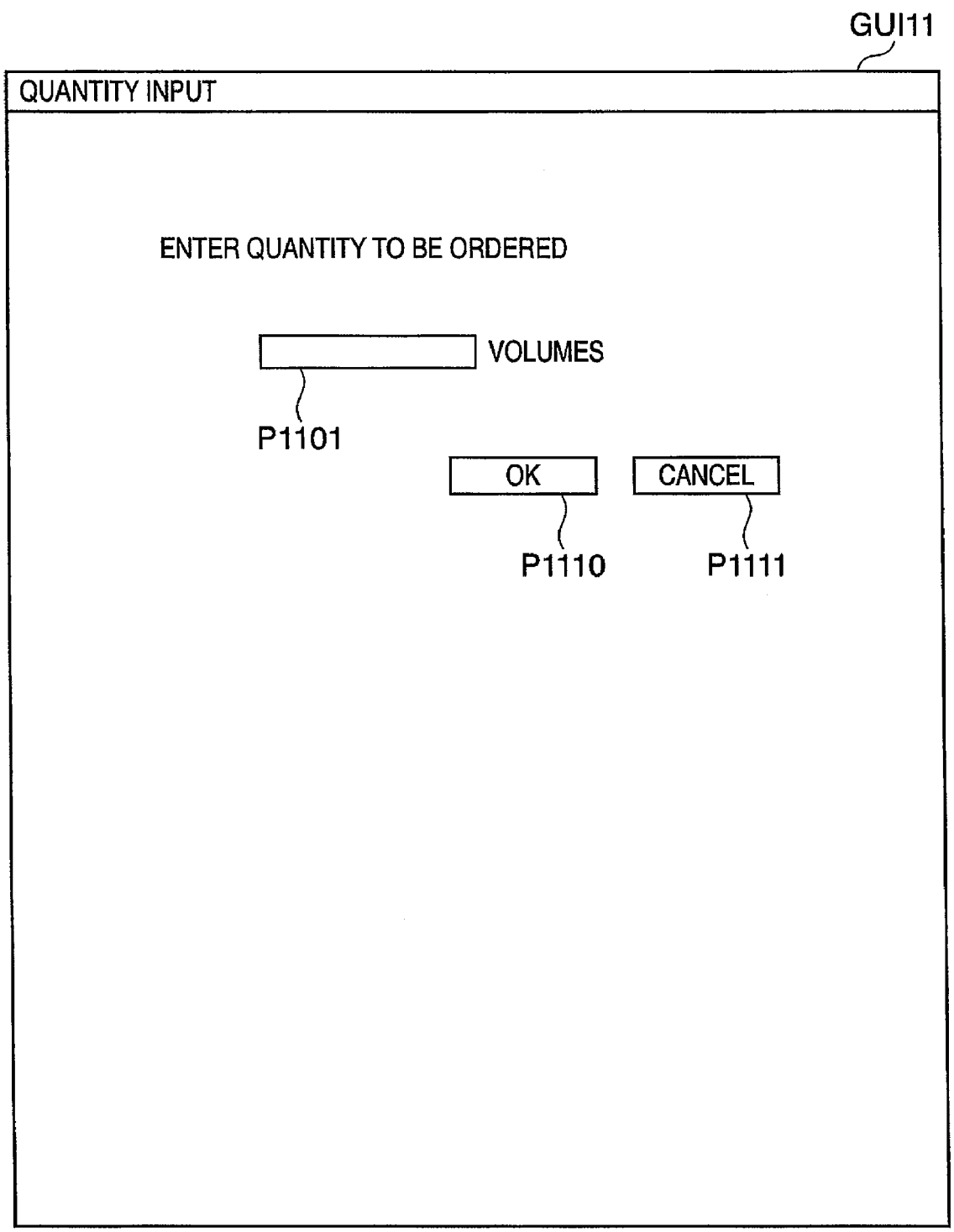
FIG. 11 is a diagram showing a Web page for an admitted subscriber to enter a number of copies to be ordered in the information processing apparatus according to the first embodiment of the present invention.

After the admitted subscriber checks the preview and clicks a link P1003 to place an order, the server 122 displays the Web page GUI 11 (FIG. 11, step (11) in FIG. 2).

When the admitted subscriber enters the order quantity in a text field P1101 and clicks a button P1110, a Web page GUI 12 is displayed (FIG. 12, step (11) in FIG. 2). The subscriber enters the address and name of the admitted subscriber in respective text fields P1201 and P1202, and enters the address and name of the person to whom the copies are to be shipped in the respective text fields P1203 and P1204. Then, the admitted subscriber clicks the button P1210 and the server 122 displays a Web page GUI 13 (FIG. 13, step (11) in FIG. 2).

Figure 14:
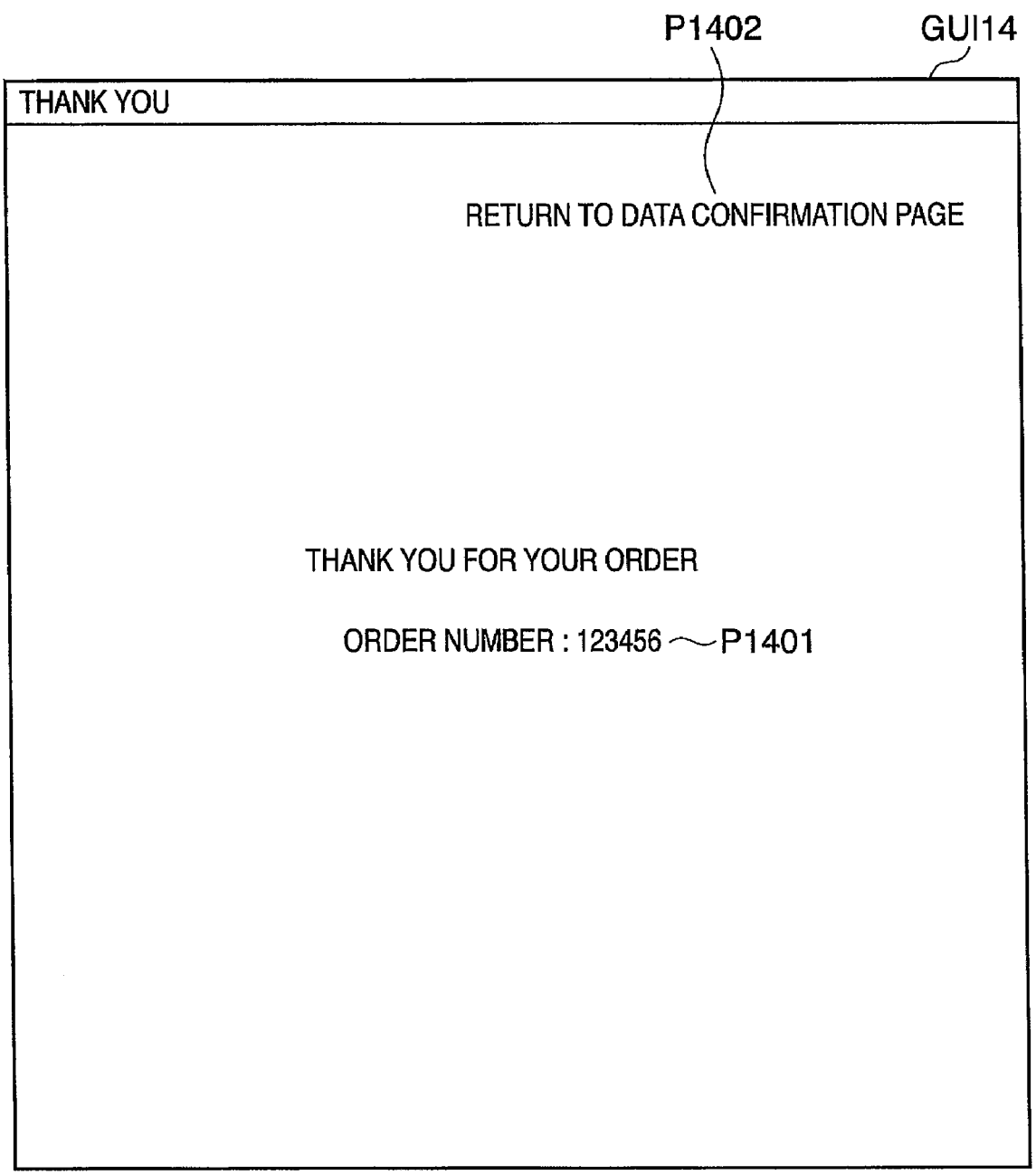
FIG. 14 is a diagram showing a Web page for an admitted subscriber to confirm order completion in the information processing apparatus according to the first embodiment of the present invention.

In FIG. 13, when the admitted subscriber confirms the order content written in P1301 and clicks an OK button P1310, the server 122 displays Web page GUI 14 (FIG. 14, step (12) in FIG. 2). An order number used to inquire about the order and so forth is written in P1401, and therefore, by recording this number, the admitted subscriber finishes ordering. When re-ordering, clicking on the link P1402 shifts to Web page GUI 10. It should be noted that clicking the cancel buttons P1111, P1211, and P1311 in the Web page GUIs 11, 12, and 13, respectively, shifts to Web page GUI 10.

In the present embodiment, payment by C.O.D. is assumed, and therefore there is no need for a description relating to invoicing in the GUI 14. Nevertheless, a description of a bank account number to which payment should be made may be supplied and instructions to make payment thereto may be added to the GUI 14. In addition, other methods of settling accounts may be used, for example, by inserting between GUI 13 and GUI 14 a screen in which to enter a credit card number. In any event, the method of settling accounts is not essential to a description of the first embodiment of the present invention and is therefore omitted.

Where payment has been confirmed or payment by C.O.D. or the like is certain, the server 122 turns to an album data printing step (step (13) in FIG. 2). If at this point payment has not been confirmed, the server 122 turns to the album data printing step once the settlement of accounts is completed (for example, on the occasion of notification from a settlements system or a clear instruction from a management tool). That which is printed in the printing step is sent by post to the shipping address that the admitted subscriber instructed in P1203 and P1204 in GUI 12.

Figure 15:
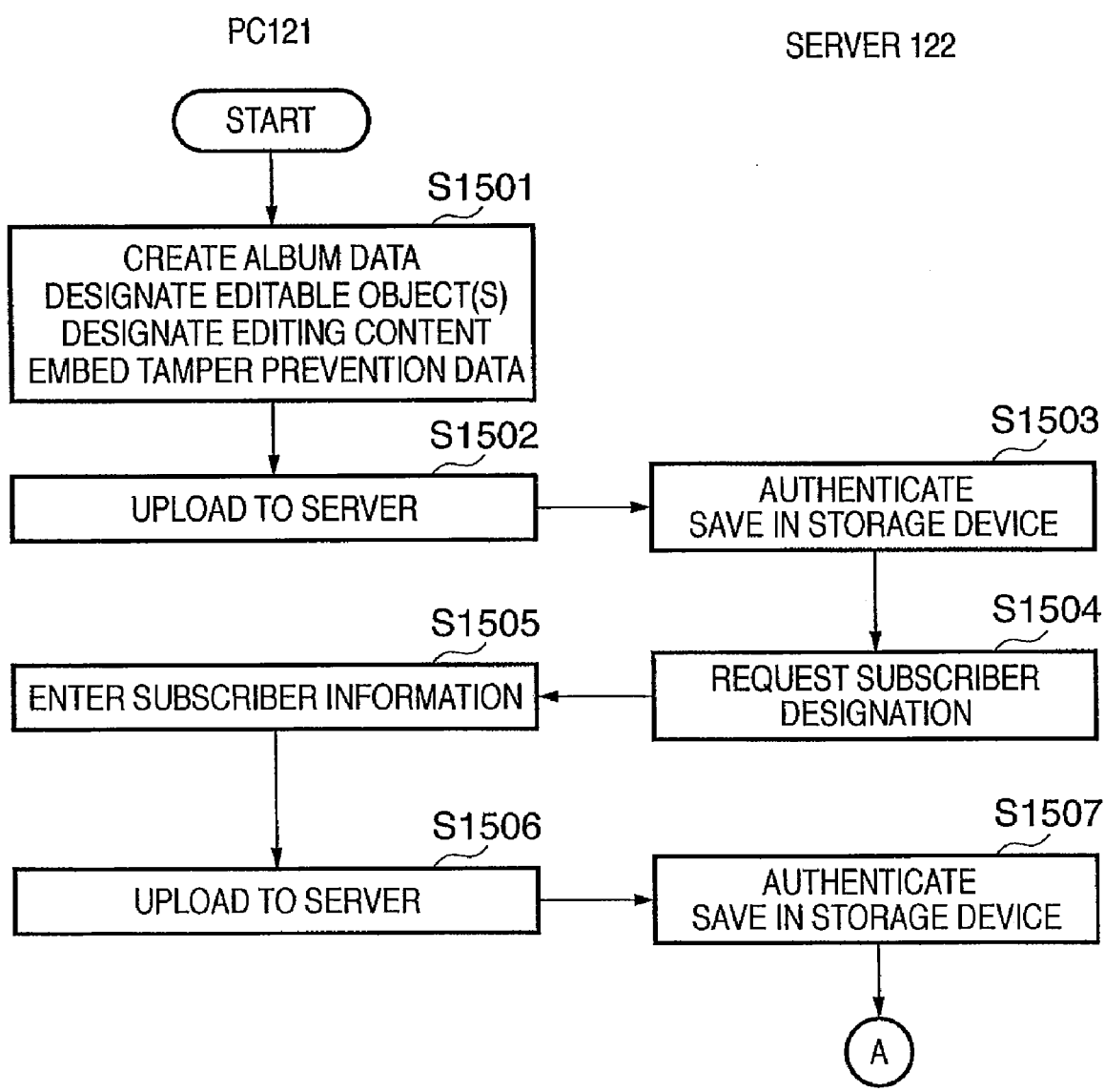
FIG. 15 is a flow chart illustrating an editing operation in an information processing apparatus according to the first embodiment of the present invention.
Figure 16:
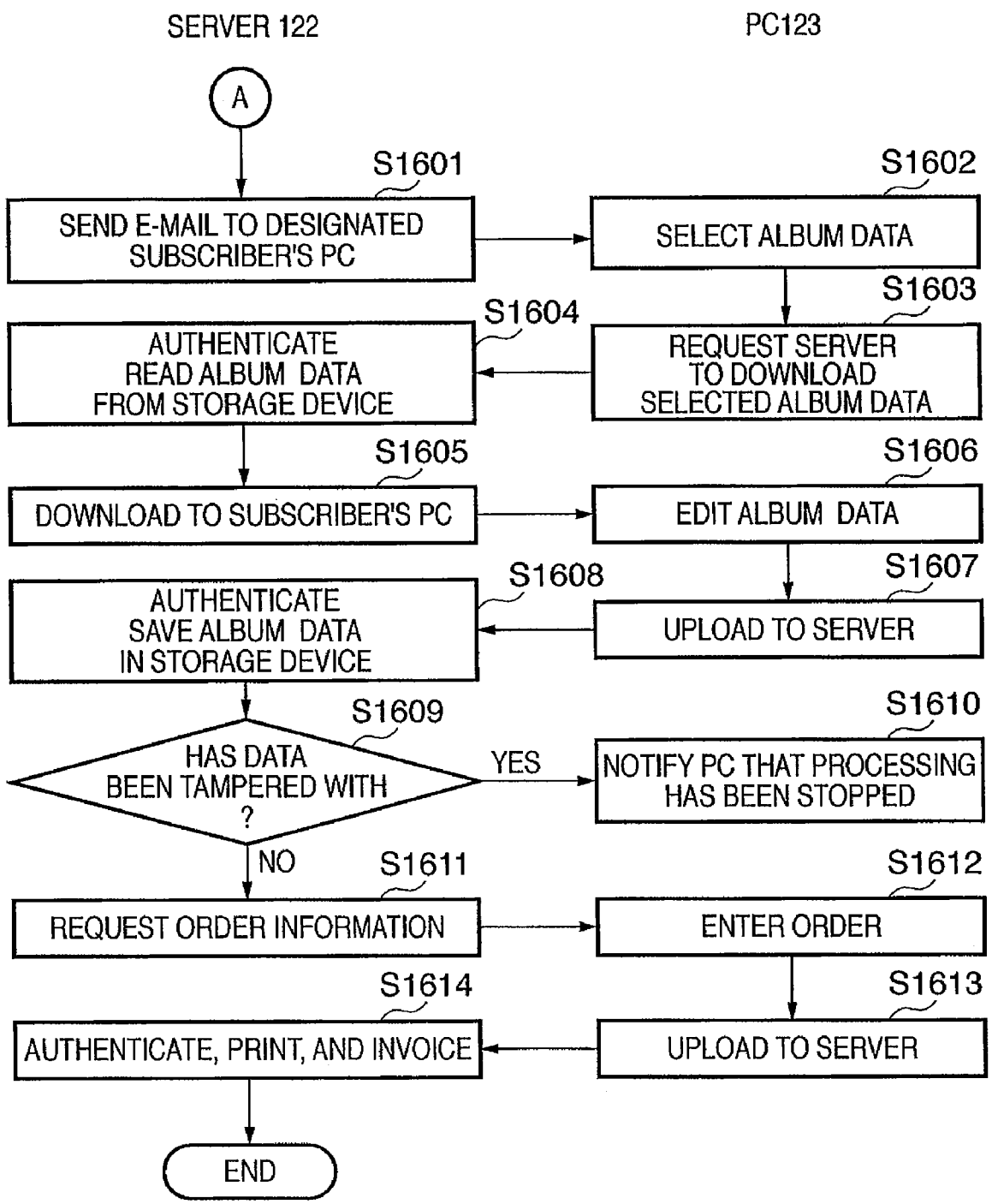
FIG. 16 is a flow chart illustrating an editing operation in an information processing apparatus according to the first embodiment of the present invention.

A further description is now given of operations performed by the PC 121 as well as the server 122 and the PC 123 of the first embodiment of the present invention, using the flow charts shown in FIG. 15 and FIG. 16. In step S1501 shown in FIG. 15, the original album editor uses the PC 121 to create album data. Further, the original album editor instructs allowed objects that allow editing by an admitted subscriber as well as the editing content. Then, the original album editor adds to the album data information relating to the allowance of editing of the objects. For later tamper inspection, the original album editor further embeds tamper prevention data in the album data. This tamper prevention data is embedded so that, when the information relating to the allowance of editing of the objects is deleted from the album data, this tamper prevention data is also deleted with it.

Then, in step S1502, the PC 121 uploads the album data, including the information relating to the allowance of editing of the objects and the tamper prevention data, to the server 122.

The server 122 in step S1503 carries out an authentication process on the uploaded album data and saves the uploaded album data in the data storage device 124. Here, for example, if the album data has a predetermined format and the original album editor is a proper user, then the upload of the album data is authenticated as proper and the foregoing save process is executed. Then, in step S1504, the server 122 requests that the PC 121 instruct an admitted subscriber (that is, allow editing).

At the PC 121, in step S1505 the original album editor instructs an admitted subscriber and the PC 121 uploads to the server 122 information relating to the instructed admitted subscriber in step S1506. The server 122, having received such information, and after performing an authentication process on the information relating to the admitted subscriber, saves the data on the information relating to the admitted subscriber in the data storage device 124 (step S1507). Here, if the information relating to the admitted subscriber has a predetermined format, or if the instructed admitted subscriber satisfies predetermined conditions, then the information relating to the admitted subscriber is authenticated as proper and the foregoing save process is executed. The information relating to the admitted subscriber contains the name, e-mail address, and so forth of the admitted subscriber.

Next, moving to FIG. 16, in step S1601 the server 122 sends an e-mail to the e-mail address contained in the information relating to the admitted subscriber instructed as described above. In step S1602, the admitted subscriber, having received the e-mail, selects album data in accordance with the description in the e-mail. Then, in step S1603, the admitted subscriber's PC 123 requests download of the selected album data from the server 122.

The server, having received the album data download request from the admitted subscriber's PC 123, in step S1604 performs a process of authenticating the admitted subscriber and then reads out from the data storage device 124 the relevant album data. In step S1605, the server 122 downloads the album data to the PC 123. Here, if, for example, it is determined from authentication information such as a password or a user ID transmitted from the admitted subscriber's PC 123 that the admitted subscriber is a person instructed by the original album editor, then the admitted subscriber is authenticated as proper and the server 122 executes the above-described download process. The admitted subscriber password and user ID may be provided in the above-described e-mail.

In step S1606, the admitted subscriber's PC 123, in accordance with the information relating to the allowance of editing of the objects attached to the album data that has been downloaded, carries out editing of the album data. Then, in step S1607, the edited album data is uploaded to the server 122.

The server 122, after performing an authentication process on the edited album data, saves the edited album data thus sent in the data storage device 124. Here, if, for example, the edited album data has a predetermined format it is authenticated as proper, then the above-described saving process is executed. In step S1609, the server 122 inspects the edited album data and determines if it has been subjected to unauthorized editing, that is, has been tampered with, by determining whether or not tamper prevention data is embedded in the edited album data. Specifically, the server 122 determines whether or not the album data has been edited in a way other than that which the original album editor instructed by the content of the information relating to the allowance of editing of the objects in step S1501 described above. If tamper prevention data is not embedded in the album data, then the server 122 determines that the PC 123 has deleted information relating to the allowance of editing of the objects from the album data, released restrictions relating to editing, and engaged in unauthorized editing, that is, has tampered with, the album data. Then, if the tamper prevention data is not embedded in the album data, in step S1610 the server 122 notifies the admitted subscriber's PC 123 that the server 122 has stopped accepting the admitted subscriber's PC 123 and terminates processing.

However, if tamper prevention data is embedded in the album data and it is determined that there has been no unauthorized editing of or tampering with the album data, then in step S1611 the server 122 requests that the admitted subscriber's PC 123 set order information relating to the edited album data. In accordance with the operations of the admitted subscriber, in step S1612 the admitted subscriber enters the order contents via the PC 123, and in step S1613 the PC 123 uploads the entered order contents to the server 122.

The server 122, having received the order information, in step S1614, after authenticating the order information, prints the edited album data according to the set order contents. Here, if the order information has a predetermined format it is authenticated as proper and the foregoing printing is executed. Then, the server 122 also carries out an invoicing process for the cost of printing. This printing process may be accomplished by transmitting a print instruction to the printing apparatus 125 connected to the server 122, or it may be accomplished by outsourcing the printing to a print server of a printing enterprise independent of the server 122 and outside the system and causing an external printing apparatus 125 to print. Thus, printed matter based on the edited album data is delivered to the subscriber possessing the PC 123 and the process ends.

As described above, the information processing apparatus according to the present embodiment allows editing by third parties of only certain objects within data provided to a server, and moreover, can prevent tampering with or changing such data in ways that exceed the intent of an original editor.

(Second Embodiment)

In the first embodiment of the present invention described above, a description is given of a case in which an admitted subscriber's PC 123 downloads album data created with an original album editor's PC 121 from a server 122 and creates edited album data.

Figure 17:
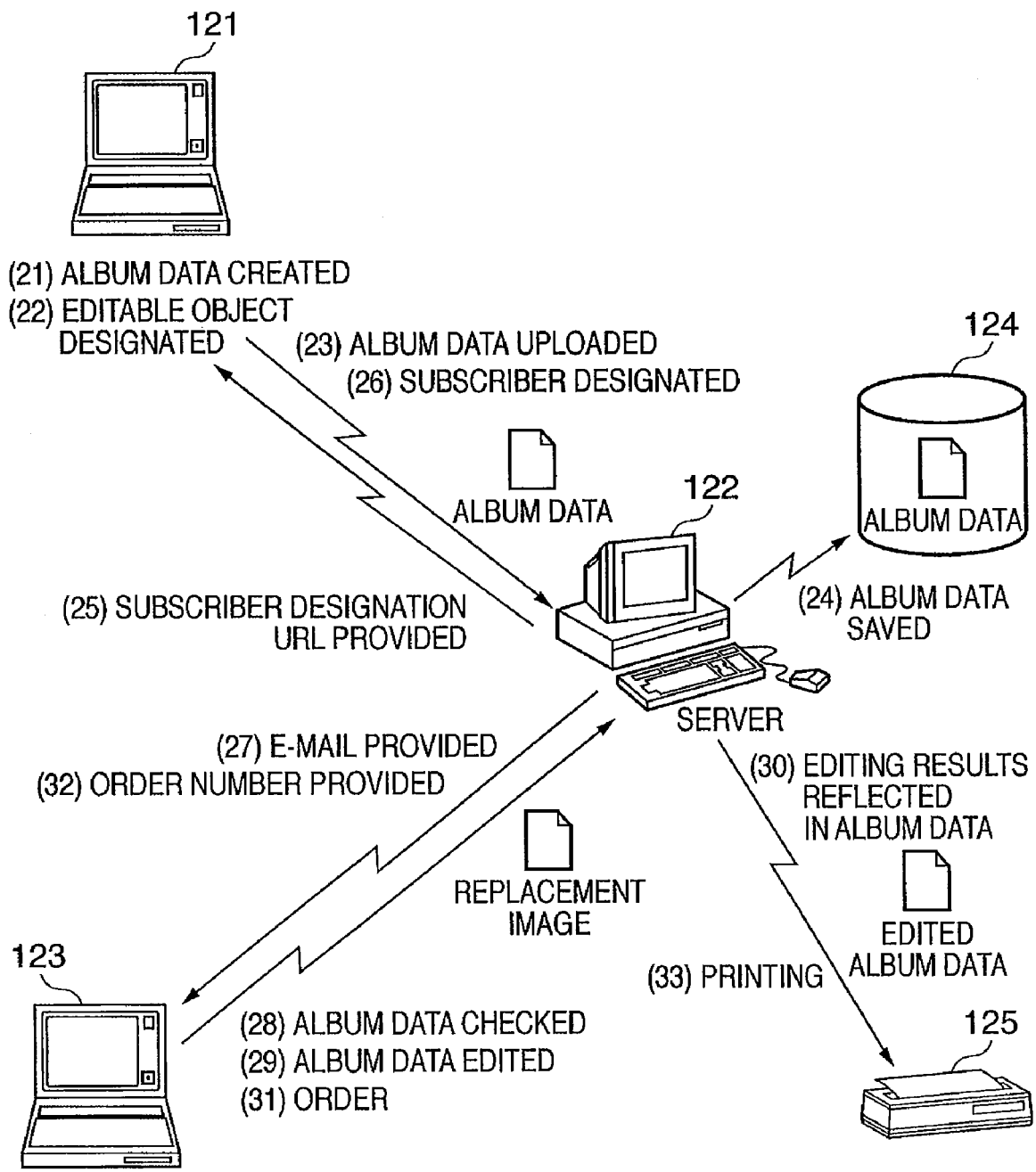
FIG. 17 is a diagram illustrating the system of an information processing apparatus and the operating procedure of the processes performed by the system according to a second embodiment of the present invention.

In the second embodiment, a description is given, with reference to FIG. 17, of a case in which the admitted subscriber's PC 123 does not download album data but instead checks a preview of the album data transmitted from the server 122, provides editing instructions, and the server 122 creates edited album data from the album data created using the original album editor's PC 121. In the following description, descriptions of portions that are identical to those of the first embodiment are omitted and a description of those portions that are unique to the present second embodiment of the present invention is given instead. However, it should be noted that, in this second embodiment, the display of the GUI 12 shown in FIG. 11 is carried out by clicking a link P1903 shown in FIG. 19.

In the second embodiment, the server 122, in accordance with information relating to the allowance of editing that is attached to the album data, provides to the PC 123 a preview for accepting editing instructions. The PC 123 in a step (29) transmits object editing instructions to the server 122. In addition, when replacing images, that image data is transmitted to the server 122. Moreover, the server 122 in a step (30) reflects the editing instructed from the PC 123 in the album data uploaded from the PC 121.

(Data Structure Example)

Next, a description is given of an example of a data structure in the second embodiment of the present invention, with reference to FIG. 18. The data structure example shown in FIG. 18 differs from the data structure example shown in FIG. 5 in that values for the /Type key and the /Id key are included in the dictionary that is the value for the /Editable key in b2 and c2 in FIG. 5 whereas in b2' and c2' shown in FIG. 18 a /Type key and an /Icon key are included, and further, the PDF catalog objects indicated by d1 and d2 in FIG. 5 are not present.

It should be noted that the value for the /Icon key indicates a location for displaying on a Web browser an icon P2030 shown in FIG. 20 described later, and indicates the coordinates in default user space units.

(Operations Performed by the Admitted Subscriber and the Corresponding Processes (1))

Figure 19:
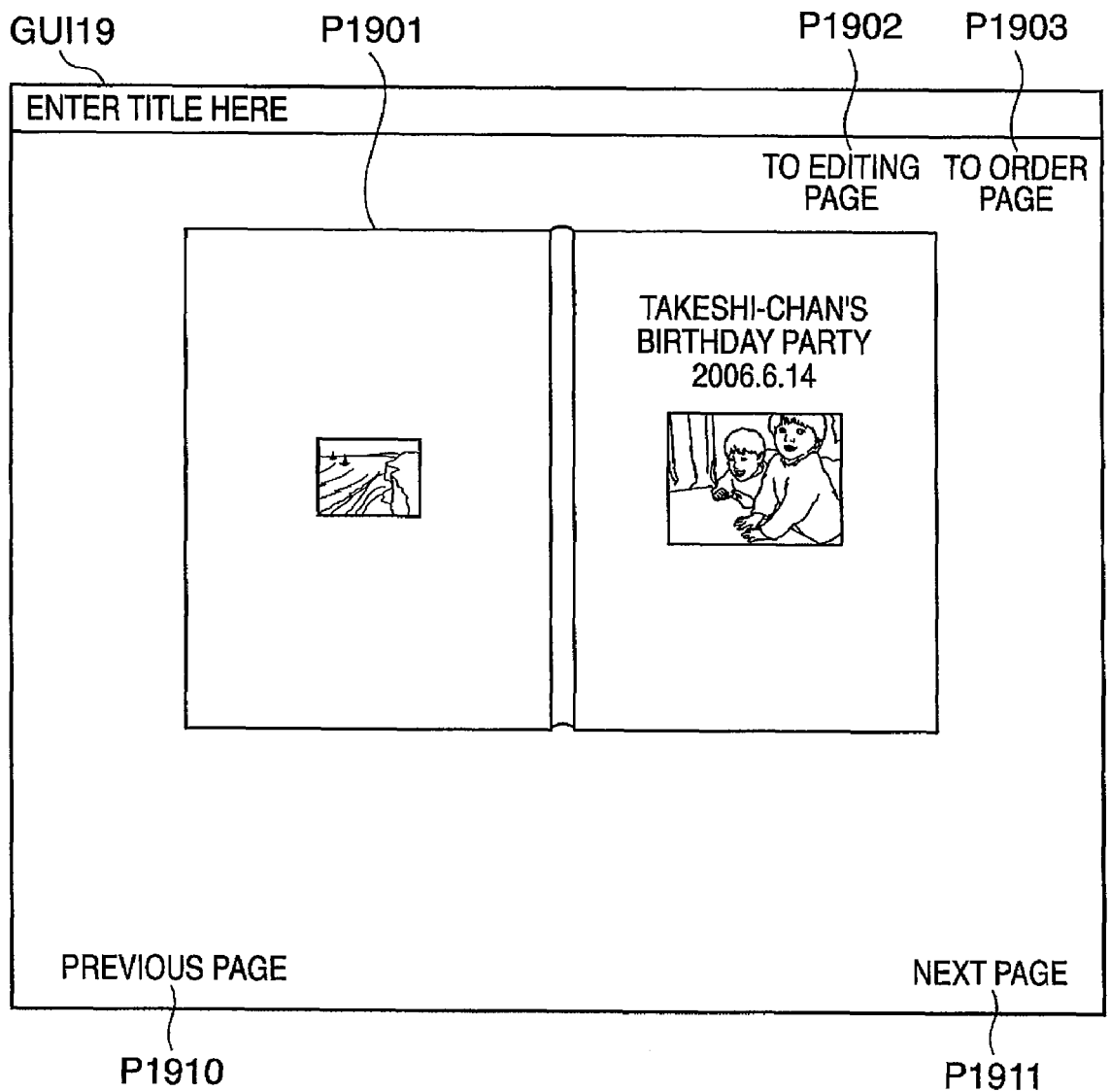
FIG. 19 is a diagram showing a Web page for an admitted subscriber to check album data in the information processing apparatus according to the second embodiment of the present invention.

The admitted subscriber, based on a URL described in an e-mail, accesses the server 122 through the PC 123, which then displays an acquired Web page GUI 19 on the Web browser to enable the admitted subscriber to view the contents of the album data (step (28) in FIG. 18, FIG. 19). The GUI 19 is a dynamic page marked by a session ID issued at each request of the admitted subscriber's PC 123 to the server 122 to access this URL, and this session ID is kept even through later screen shifts.

When the admitted subscriber's PC 123 attempts to request display of the album data on the Web browser based on the URL provided by the e-mail, the server 122 displays a preview image (P1901) either by generating JPEG data from the album data or using JPEG data generated when the album data was uploaded. Prior to generating the JPEG data, the server 122 determines if the objects arranged in the album data page are editable by looking for an /Editable key attached to the album data.

Then, if the /Editable key is present, the server 122 generates, together with the JPEG data displayed in P1901, JPEG data containing an icon or icons for the purpose of indicating an editable allowed object or objects used in a Web browser screen GUI 20 (or any of from GUI 21 through GUI 26), and then displays a link P1902 on the Web page GUI 19.

At this time, the icon for indicating an editable allowed object is generated at a position instructed by the /Icon key in the PDF. If the album data extends over several pages, then pages other then a currently displayed page can be displayed by clicking a link P1910 or a link P1911. It should be noted that the displayed page does not display the link P1910 when it is the first page, nor does it display the link P1911 when it is the last page.

When there is a portion or portions of the album data that the original album editor allows an admitted subscriber to edit, the link P1902 is displayed. When the admitted subscriber clicks the link P1902, the GUI 20 shown in FIG. 20 (or any one of GUI 21 shown in FIG. 21, GUI 22 shown in FIG. 22, GUI 23 shown in FIG. 23, GUI 23' shown in FIG. 24, GUI 25 shown in FIG. 25, and GUI 26 shown in FIG. 26), which is an editing screen, is displayed. Then, the admitted subscriber can edit those portions that allow editing (step (29) in FIG. 17). The admitted subscriber can easily check whether editing is possible by looking at the GUI. Moreover, matters can be arranged so that the admitted subscriber cannot carry out editing operations other than those that are allowed.

Figure 21:
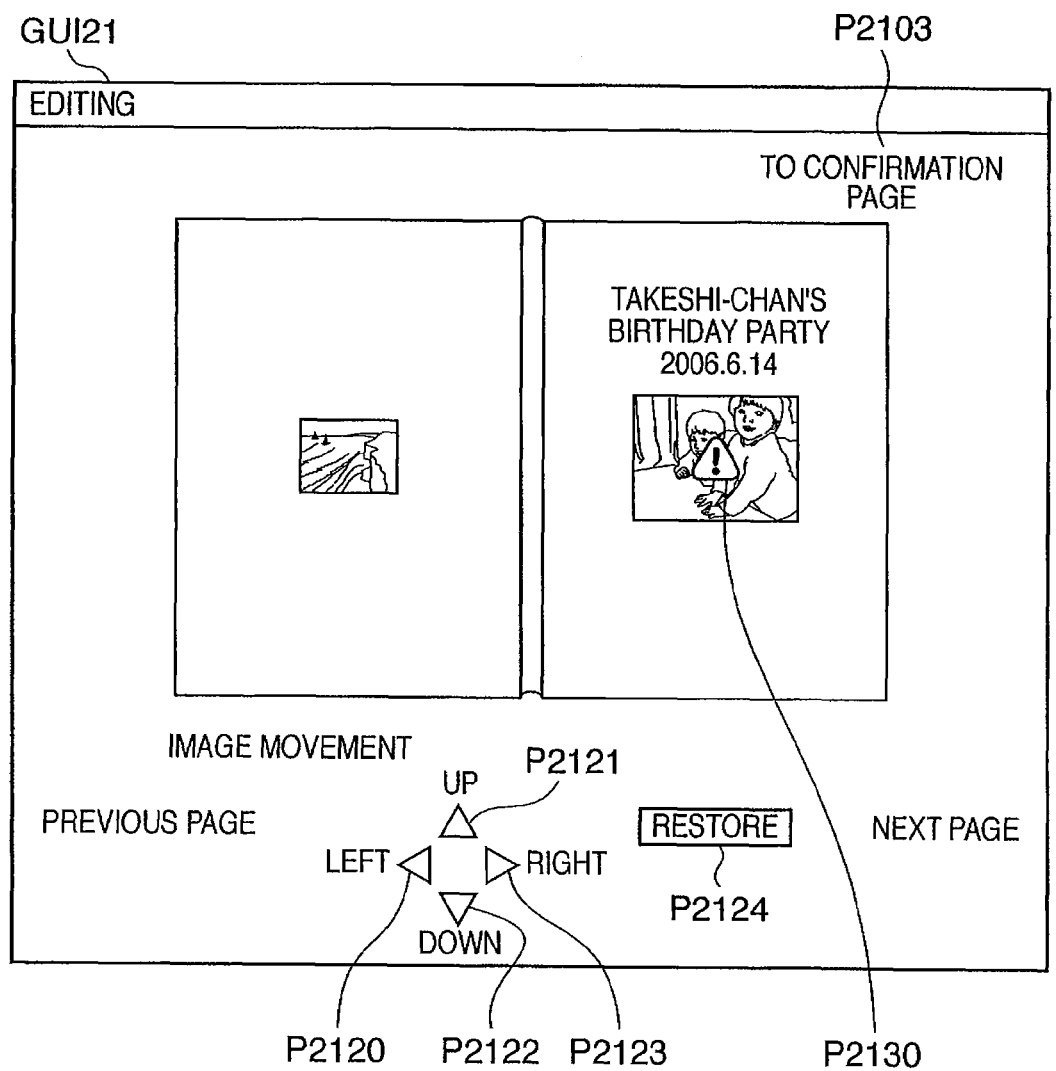
FIG. 21 is a diagram showing a Web page for an admitted subscriber to instruct movement of an album data image in the information processing apparatus according to the second embodiment of the present invention.

P2030 (or P2130, P2230, P2330, P2530, P2630) is an icon that becomes a mark that indicates an editable object in the preview image. These icons are added near an object to be edited by a mark adding function for the purpose of facilitating identification of editable objects. Replacement of the object indicated by P2030 can be instructed by P2020, P2021, and P2022.

Where the original album editor has instructed that the editing operation of replacing images be enabled, when the button P2021 is clicked a dialog box appears for selecting a file, and the admitted subscriber instructs the replacement image and clicks the dialog box's OK button. When that happens, the admitted subscriber-instructed image file path is displayed in the text field P2020. When the admitted subscriber clicks the button. P2022, the image file that the admitted subscriber instructed is uploaded to the server 122 and the GUI 20 that is a Web page in which the image is replaced with the uploaded image is displayed. It should be noted that operations differ depending on the browser, and although not shown in FIG. 20 a preview of the image file instructed by the admitted subscriber may be shown.

Where the original album editor has instructed that movement of the images be enabled, the Web page GUI 21 is displayed (FIG. 21). In FIG. 21, the admitted subscriber clicks P2120, P2123, P2121, or P2122 to move the image to the left, right, up, or down, respectively.

Figure 22:
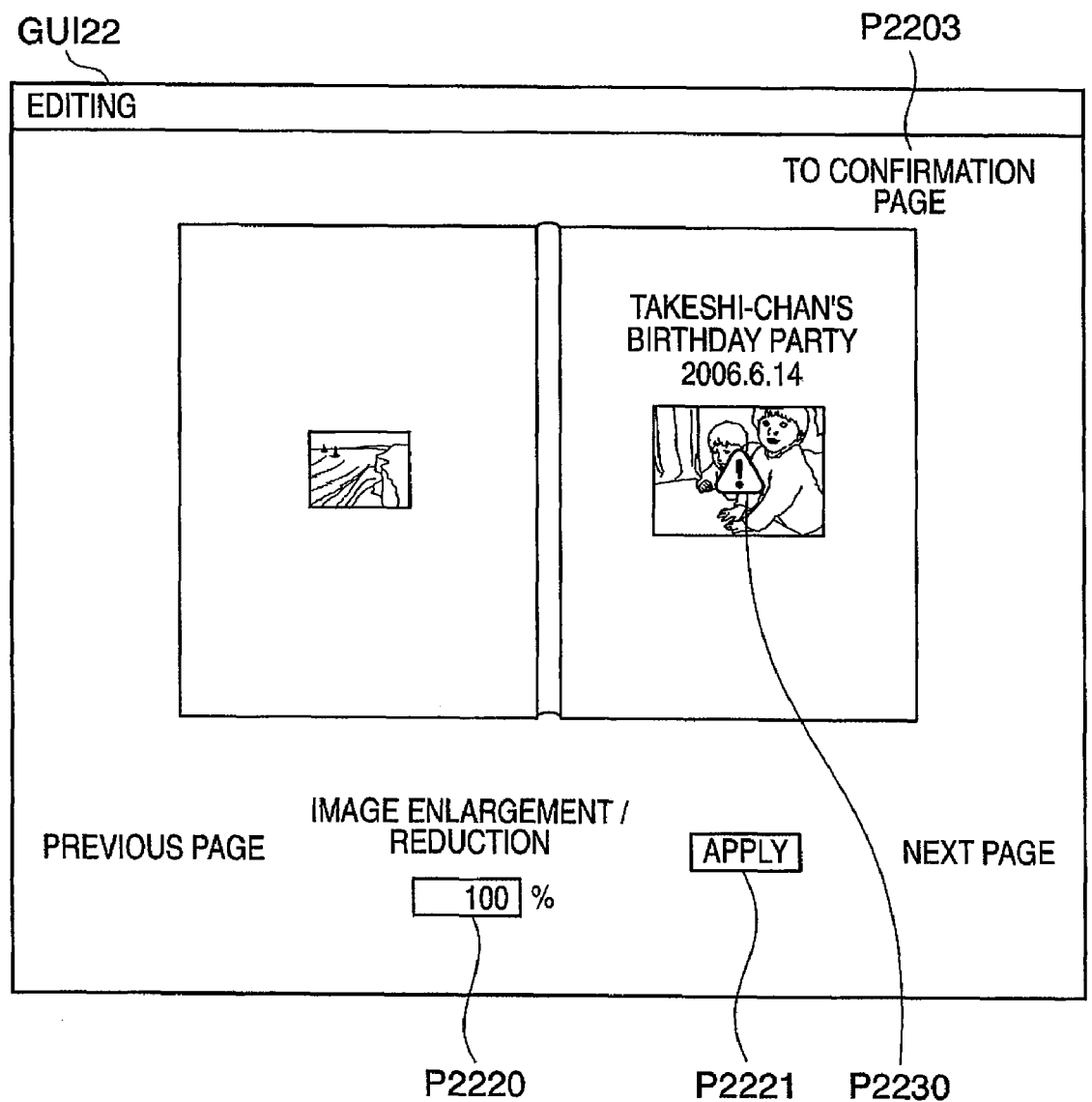
FIG. 22 is a diagram showing a Web page for an admitted subscriber to instruct enlargement/reduction of an album data image in the information processing apparatus according to the second embodiment of the present invention.

When that is done, a request is generated to the server 122 and the Web page GUI 21 that replaces the image with an image moved a prearranged amount in the instructed direction is displayed. To invalidate the editing result, clicking button S2124 displays the Web page GUI 21 that previews the album data in the state in which it was created by the original album editor. It should be noted that although in the foregoing description the amount of movement when P2120 through P2123 are clicked is assumed to be a prearranged value, alternatively a text field to instruct the amount of movement may be separately provided instead.

Where the original album editor has instructed that image enlargement and reduction be enabled, the Web page GUI 22 is displayed (FIG. 22). In FIG. 22, the admitted subscriber enters a percentage to be used in enlarging or reducing the image in a text field P2220 and clicks a button P2221. When that happens, a request is generated to the server 122, which then displays the GUI 22 in which the image is replaced with an image enlarged or reduced to the instructed percentage.

Figure 23:
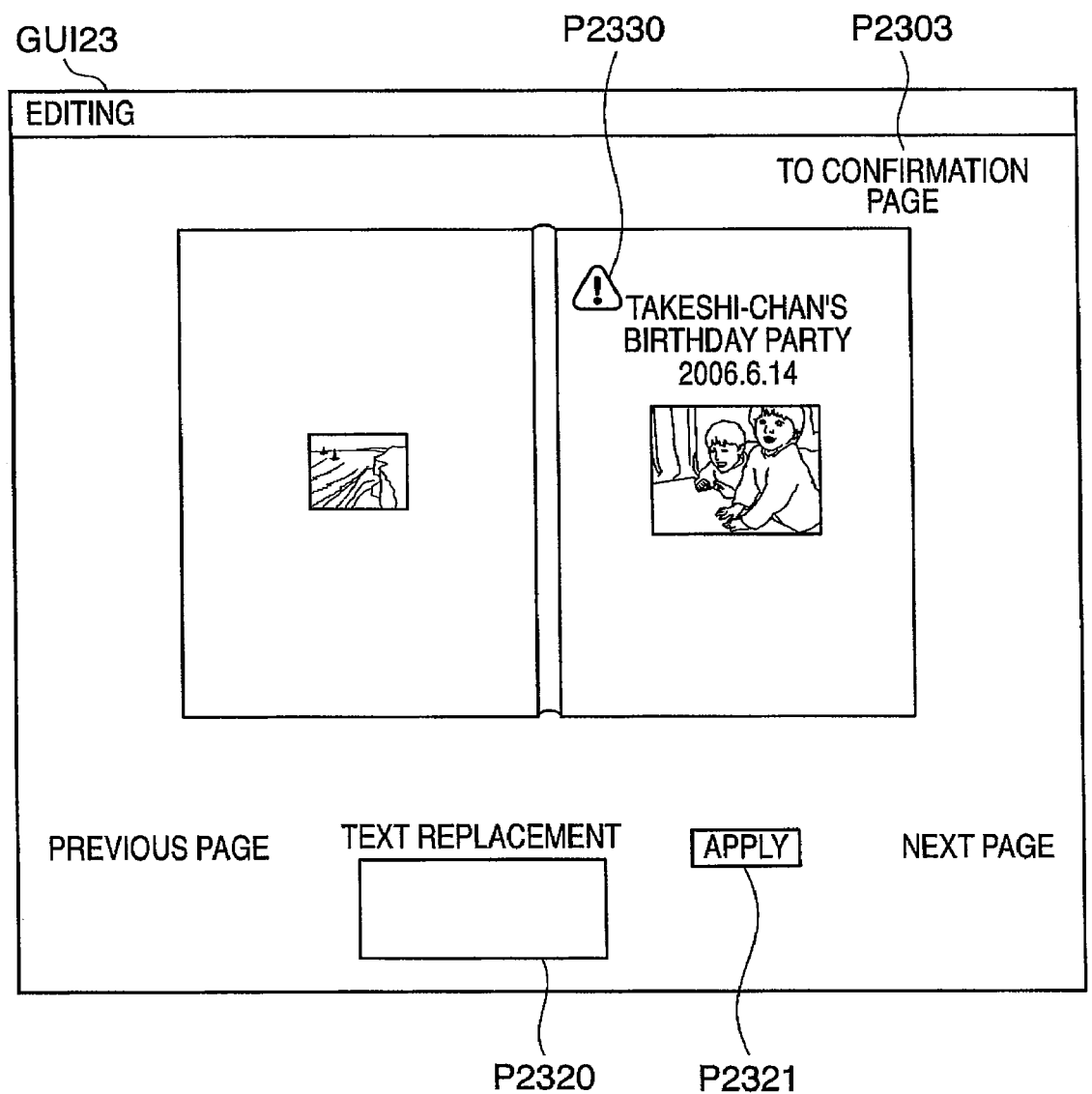
FIG. 23 is a diagram showing a Web page for an admitted subscriber to carry out replacement of album data text in the information processing apparatus according to the second embodiment of the present invention.
Figure 24:
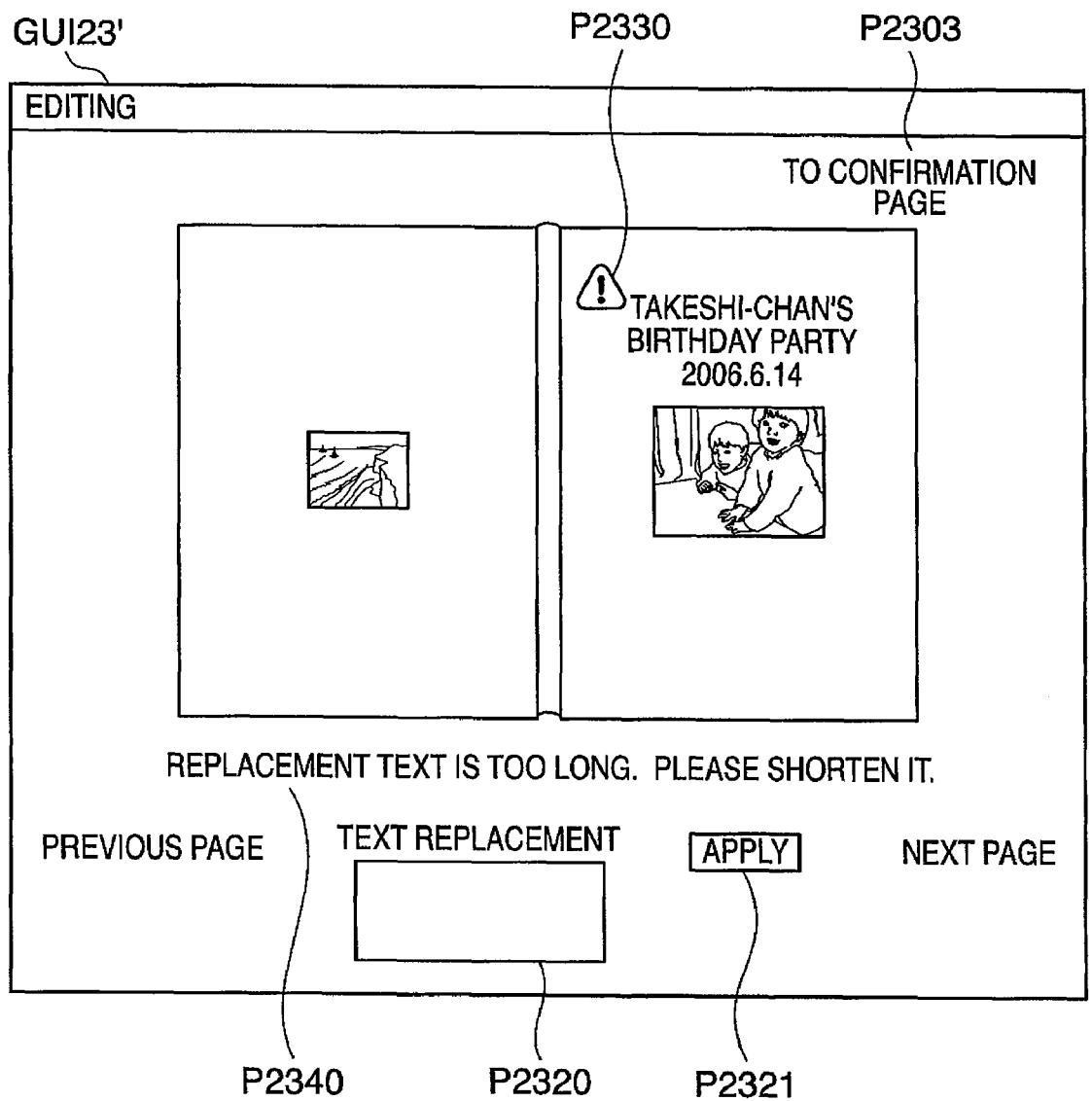
FIG. 24 is a diagram showing error message display on a web page when text is too long and cannot be shown in full when an admitted subscriber has replaced album data text, in the information processing apparatus according to the second embodiment of the present invention.
Figure 25:
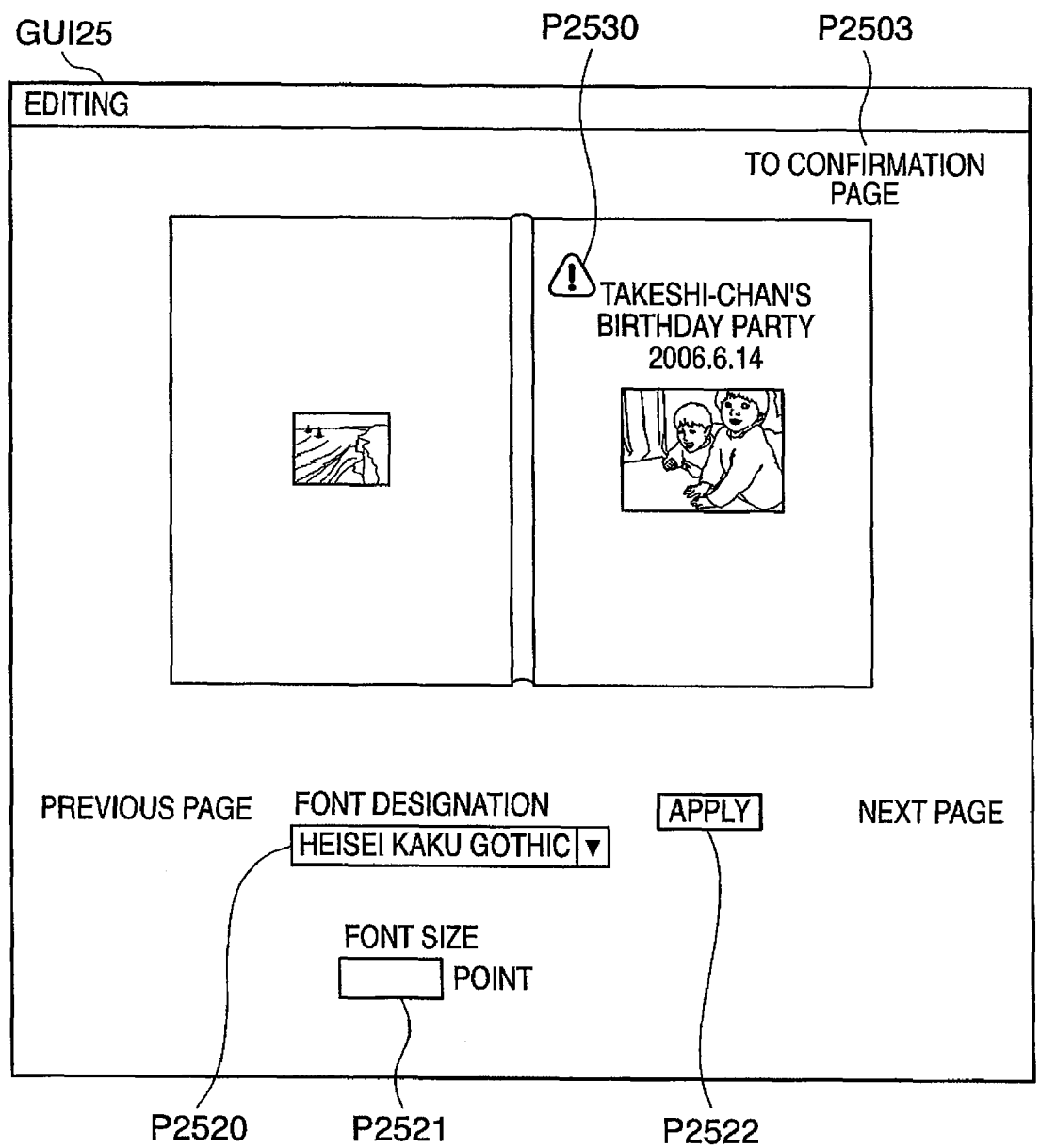
FIG. 25 is a diagram showing a Web page for an admitted subscriber to instruct album data text font name and font size in the information processing apparatus according to the second embodiment of the present invention.
Figure 26:
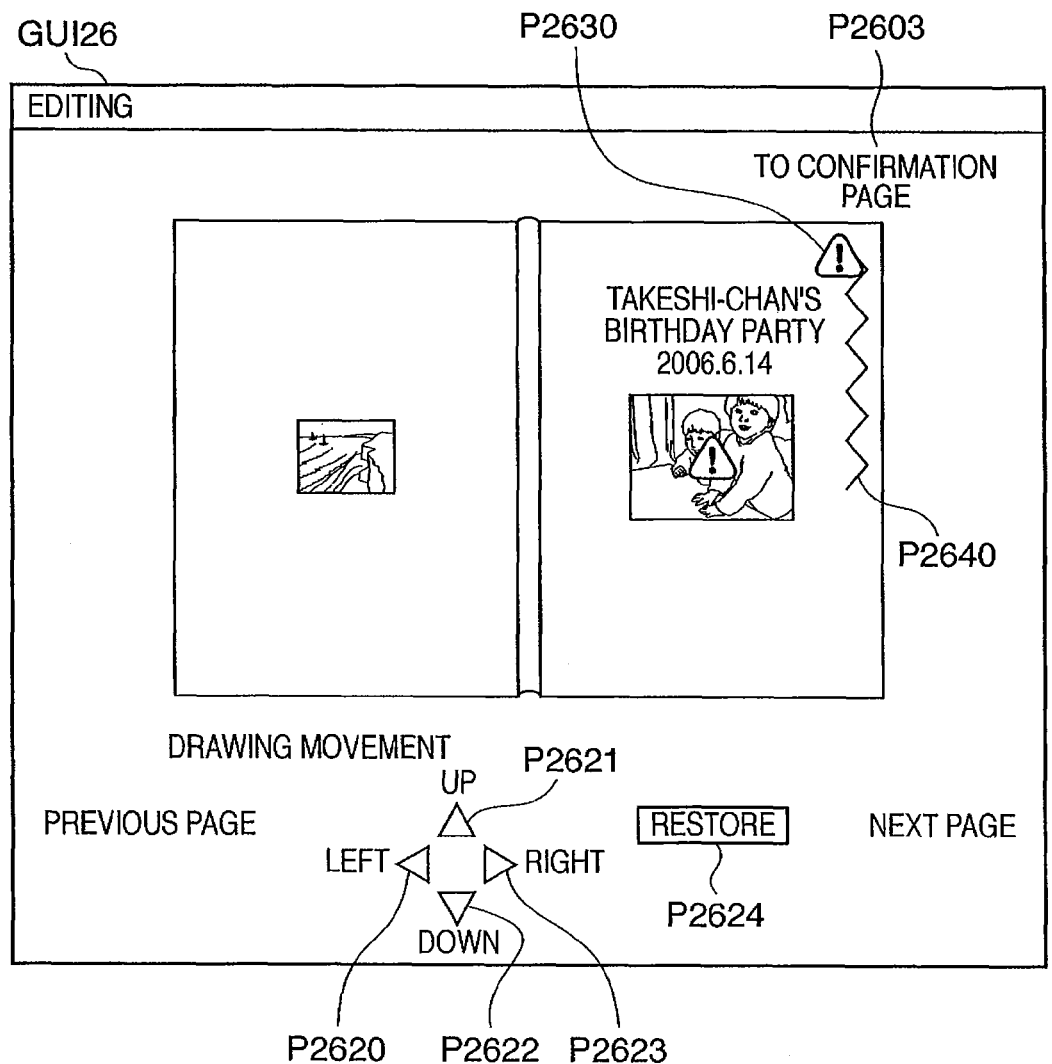
FIG. 26 is a diagram showing a Web page for an admitted subscriber to move an album data drawing in the information processing apparatus according to the second embodiment of the present invention.

Further, where the original album editor has instructed that replacement of text be enabled, the Web page GUI 23 is displayed (FIG. 23). In FIG. 23, the admitted subscriber enters a character sequence to be used in replacement in a text field P2320 and clicks a button P2321. When that happens, a request is generated to the server 122, and the server 122 displays the Web page GUI 23', shown in FIG. 24, in which the text is replaced with the character sequence instructed by the admitted subscriber. When the instructed character sequence is too long and does not fit in the field, then, for example, an error message P2340 like that shown in FIG. 24 is displayed.

Where the original album editor has instructed that instruction of the font and instruction of the font size be enabled, the Web page GUI 25 is displayed (FIG. 25). In FIG. 25, the admitted subscriber selects the font name from a list box P2520, enters the font size in the text field P2521, and clicks button P2522. When that happens, a request is generated to the server 122, which displays the GUI 25 in which the font and the font size have been changed to that instructed by the admitted subscriber. It should be noted that when what the original album editor has enabled to be instructed is either the font or the font size, then only one or the other of the corresponding list box P2520 or the text field P2521 is displayed.

Where the original album editor has instructed that instruction of the position of drawings be enabled, then the Web page GUI 26 is displayed (FIG. 26). In FIG. 26, the admitted subscriber clicks P2620, P2623, P2621, or P2622 to move the drawing to the left, right, up, or down, respectively. When that happens, a request is generated to the server 122, which then displays the GUI 26 that replaces the drawing with a drawing moved a server-prearranged amount in the instructed direction. To invalidate the editing result, clicking button S2624 displays the GUI 26 that previews the album data in the state in which it was created by the original album editor. It should be noted that although in the foregoing description the amount of movement when P2620 through P2623 are clicked is assumed to be a value prearranged by the server 122, alternatively a text field to instruct the amount of movement may be separately provided instead.

It should be noted that in the foregoing description it is assumed that there is only one object to be edited on one page and only one method of editing that is allowed. However, where a plurality of editing methods relating to a plurality of objects as in the PDF described above is allowed, editing by combining the plurality of editing methods as with a Web page GUI 27 shown in FIG. 27 is possible.

Figure 27:
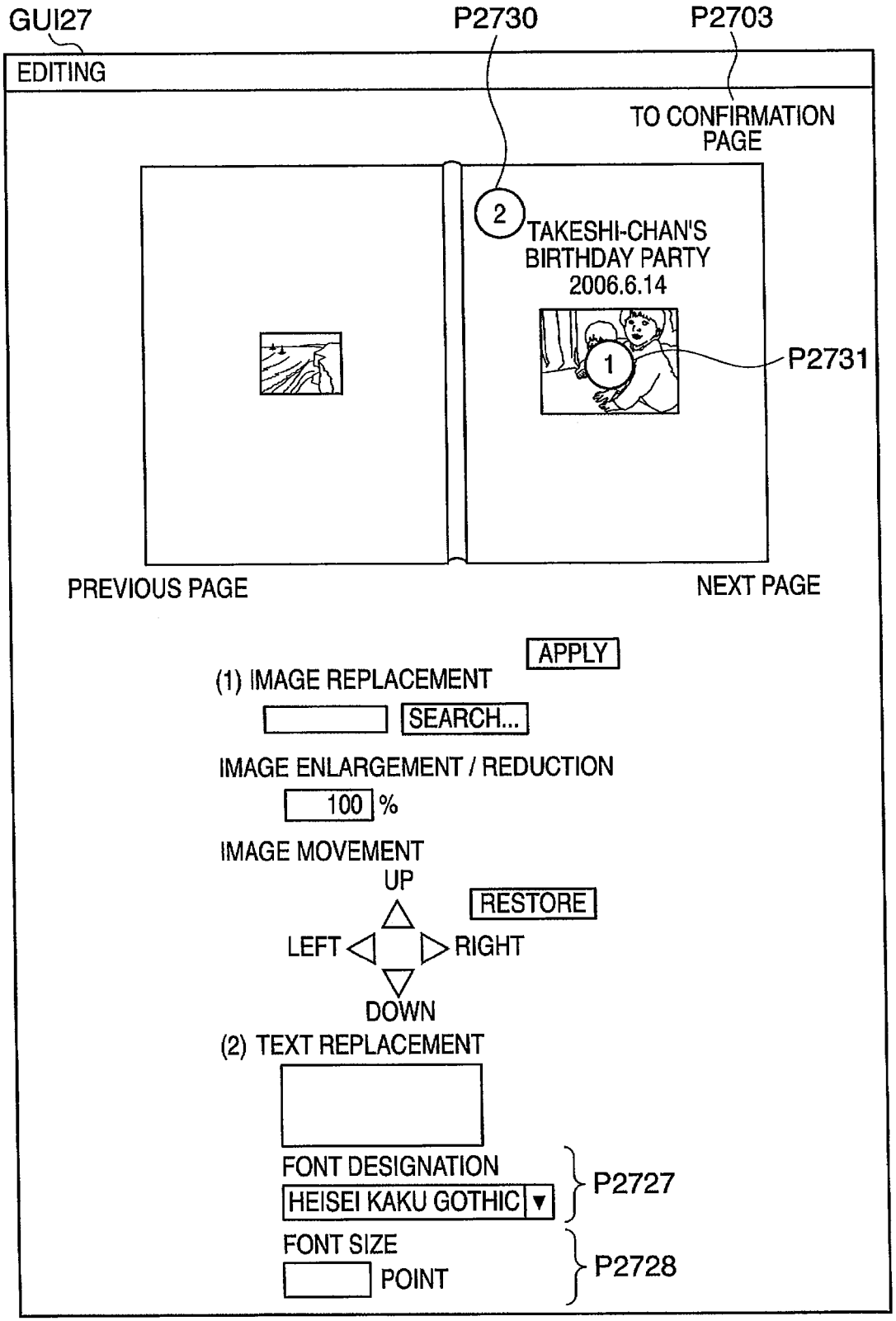
FIG. 27 is a diagram showing a Web page for an admitted subscriber to edit album data in the information processing apparatus according to the second embodiment of the present invention.
Figure 28:
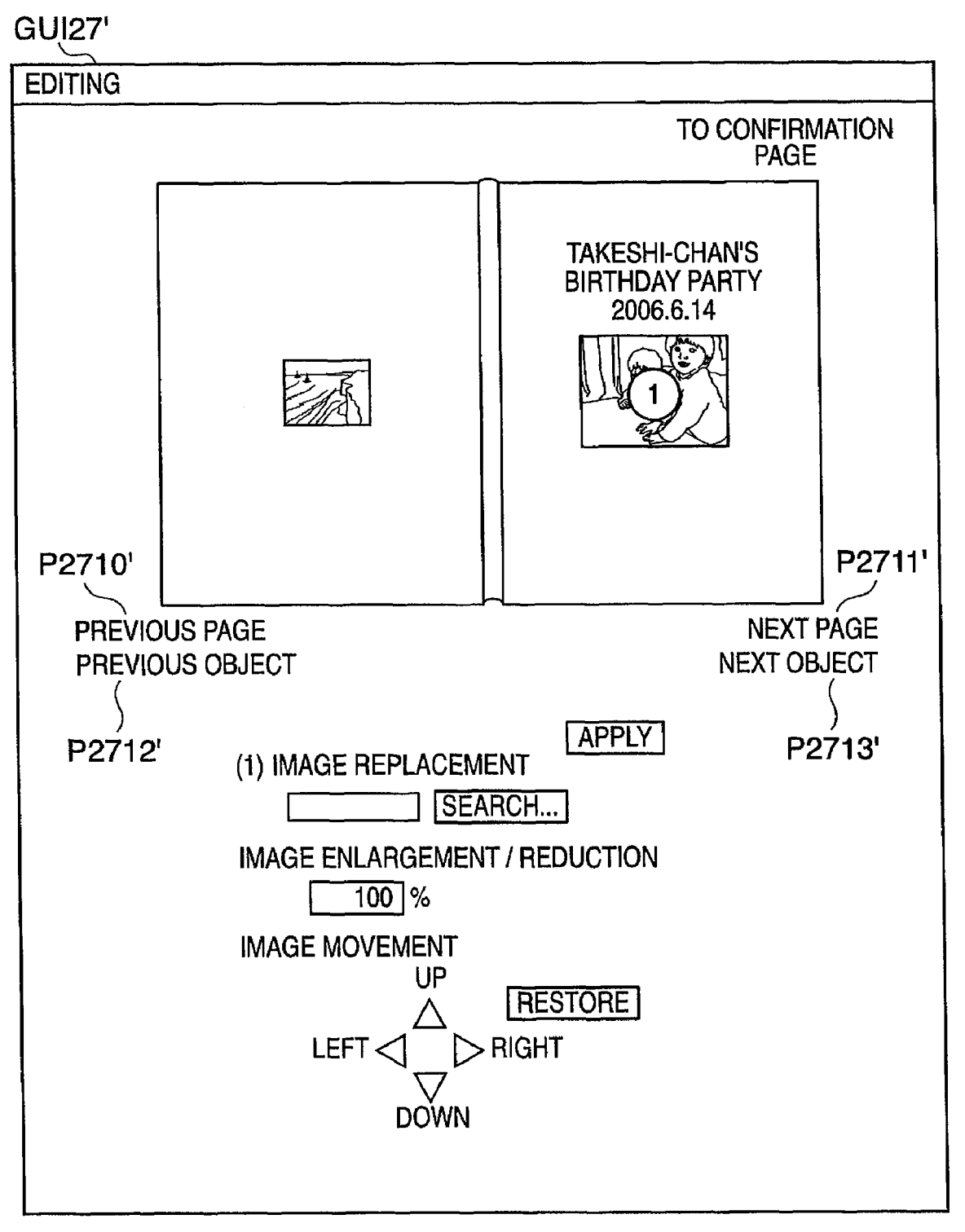

As shown in FIG. 27, not only can a plurality of objects be edited in multiple ways at once, but also, as shown in Web page GUI 27' shown in FIG. 28, a single object can be edited multiple ways at once as well. In addition, as with the Web page GUI 27" shown in FIG. 29, a single object can also be edited a single way as well.

A case of editing a single object multiple ways at once as shown in FIG. 28, when editing of other objects as well is also allowed, entails the following: In such a case, a link P2710' for shifting to the previous page and a link P2711' for shifting to the next page are required. Further, a link P2712' for shifting to a Web page for editing the previous object and a link P2713' for shifting to a Web page for editing the next object are also required.

Figure 29:
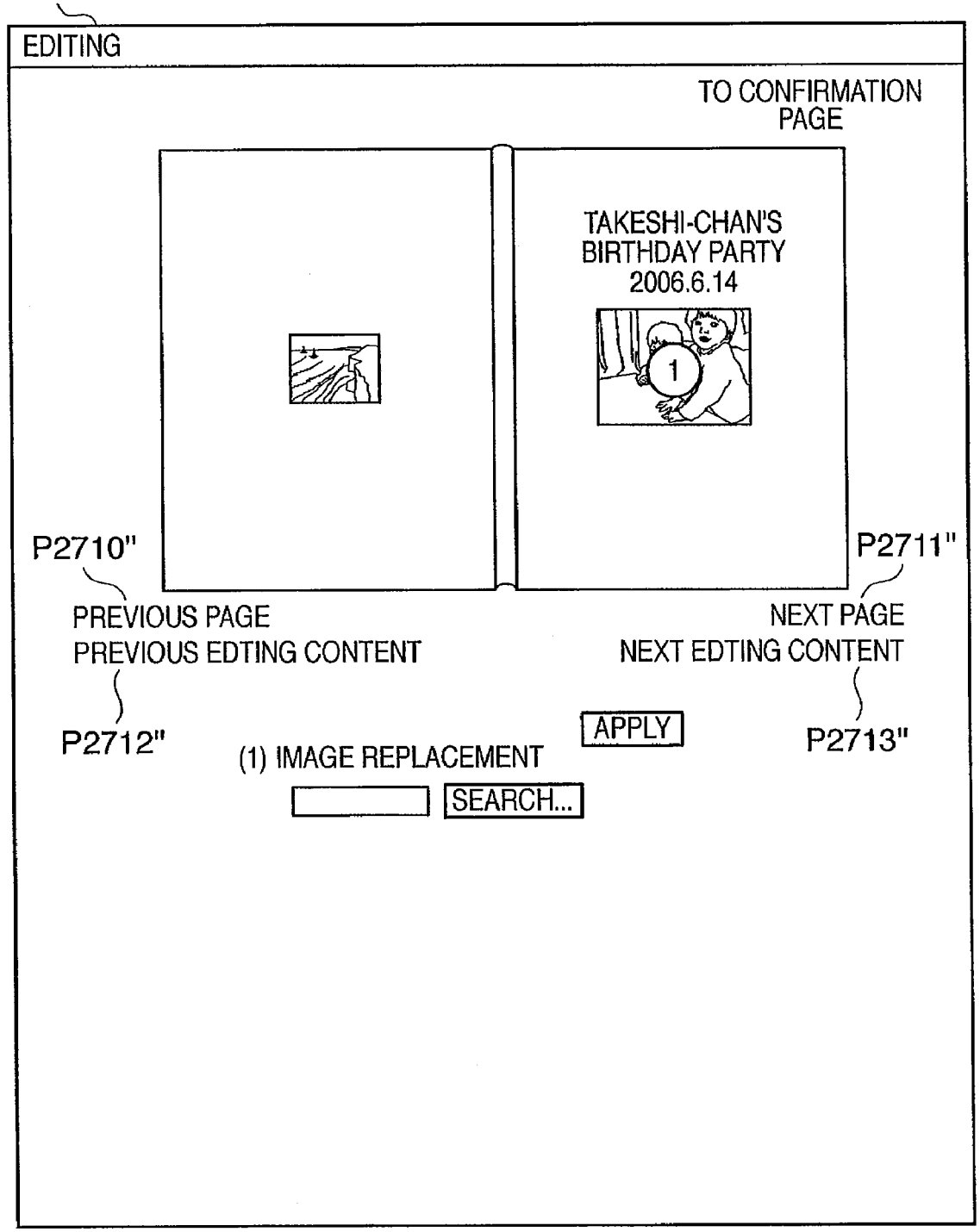
FIG. 29 is a diagram showing a Web page for an admitted subscriber to carry out editing of album data in the information processing apparatus according to the second embodiment of the present invention.

In addition, when editing a single object in a single way as shown in FIG. 29, sometimes editing of other objects or other forms of editing the same object will be allowed. In that case, a link P2710" for shifting to the previous page and a link P2711" for shifting to the next page are required. Further, a link P2712" for shifting to a Web page for carrying out editing with the previous editing content and a link P2713" for shifting to a Web page for carrying out editing with the next editing content are also required.

(Operations Performed by the Admitted Subscriber and the Corresponding Processes (2))

Where there are multiple editable objects in a single page, configuring a Web page so as to edit a plurality of objects in multiple ways as shown in FIG. 27 causes the Web page to become very long and it is difficult to see the preview while working. At such times, it is preferable to edit a single object in multiple ways as shown in FIG. 28, or edit a single object in a single way as shown in FIG. 29.

By contrast, where the number of editable objects contained in a single page is small, it is more efficient to edit a plurality of objects in multiple ways at once as shown in FIG. 27 because the work is done in a single operation. Depending on how many ways the objects are to be edited, the editing content may be changed to something that can be accomplished all at once.

For example, when it is possible to replace, enlarge, reduce, move, etc. the image (P2731) indicated by circled number 1 in FIG. 27, and further, when it is possible to replace the text of and instruct the font for the character sequence (P2730) indicated by circled number 2 in FIG. 27, making all of that editable on a single screen increases the length the Web page and makes it difficult to see the preview while working.

Figure 30:
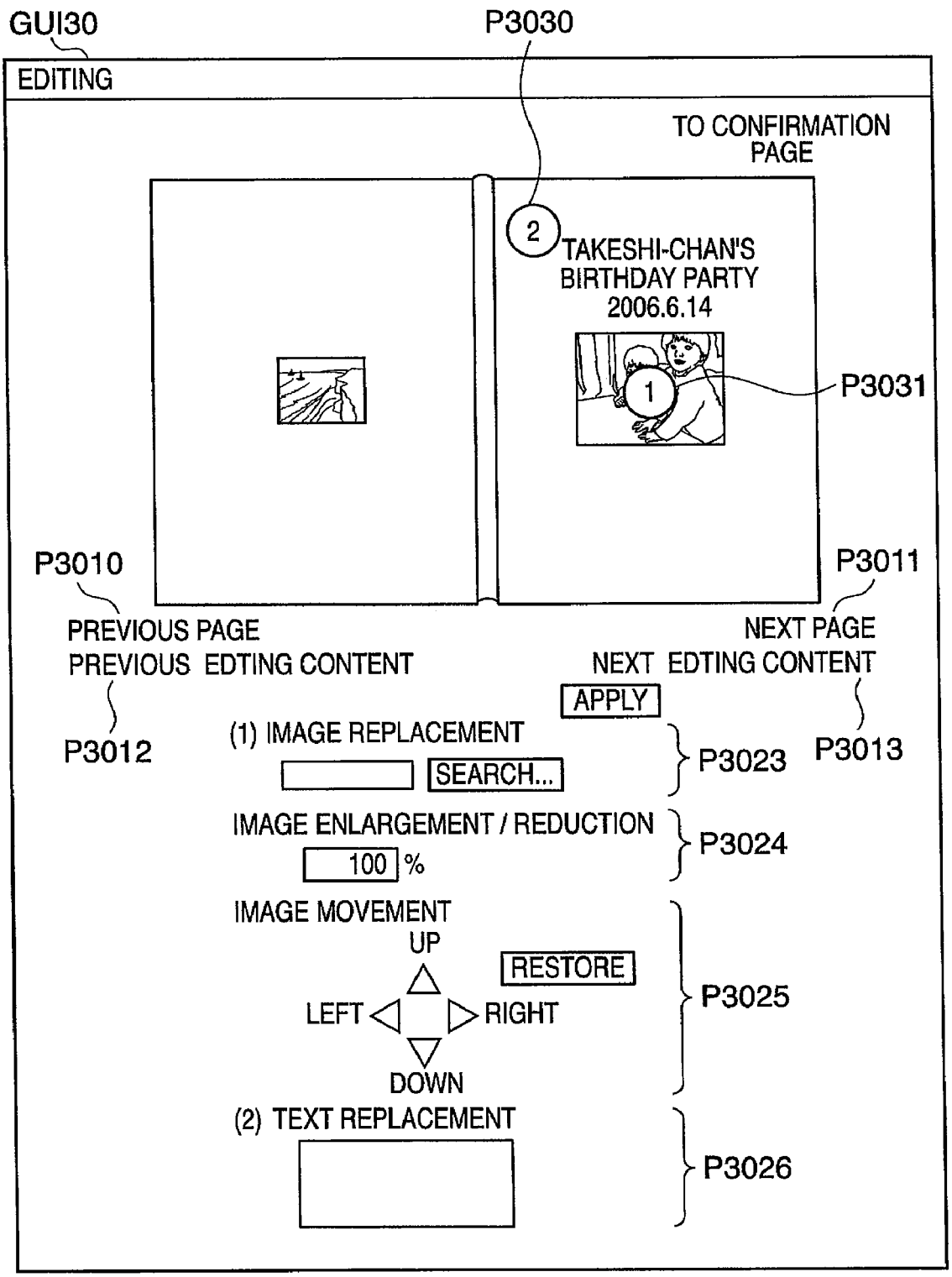
FIG. 30 is a diagram showing a variable-length Web page for an admitted subscriber to edit album data in the information processing apparatus according to the second embodiment of the present invention.

In such a case, the Web page GUI 20 shown in FIG. 30 is one that keeps the space used for editing below a certain amount so as to enable an editor to see the preview while working. In addition to links P3010, P3011 for shifting to screens for editing the previous page and the next page, respectively, there are also links P3012, P3013 for shifting to screens for editing the previous editing content and the next editing content, respectively. Additionally, the list box P2727 and the text field P2728 for instructing the font present in FIG. 27 are not displayed here, and the amount of editing that can be done all at once is limited. It should be noted that there is no need to display the links P3012 and P3013 if the screens to which they shift are the same as those indicated by P3010 and P3111.

Below, a description is given of methods of changing the editing content of that which is editable all at once using the flow charts shown in FIG. 31 and FIGS. 32A and 32B.

Figure 31:
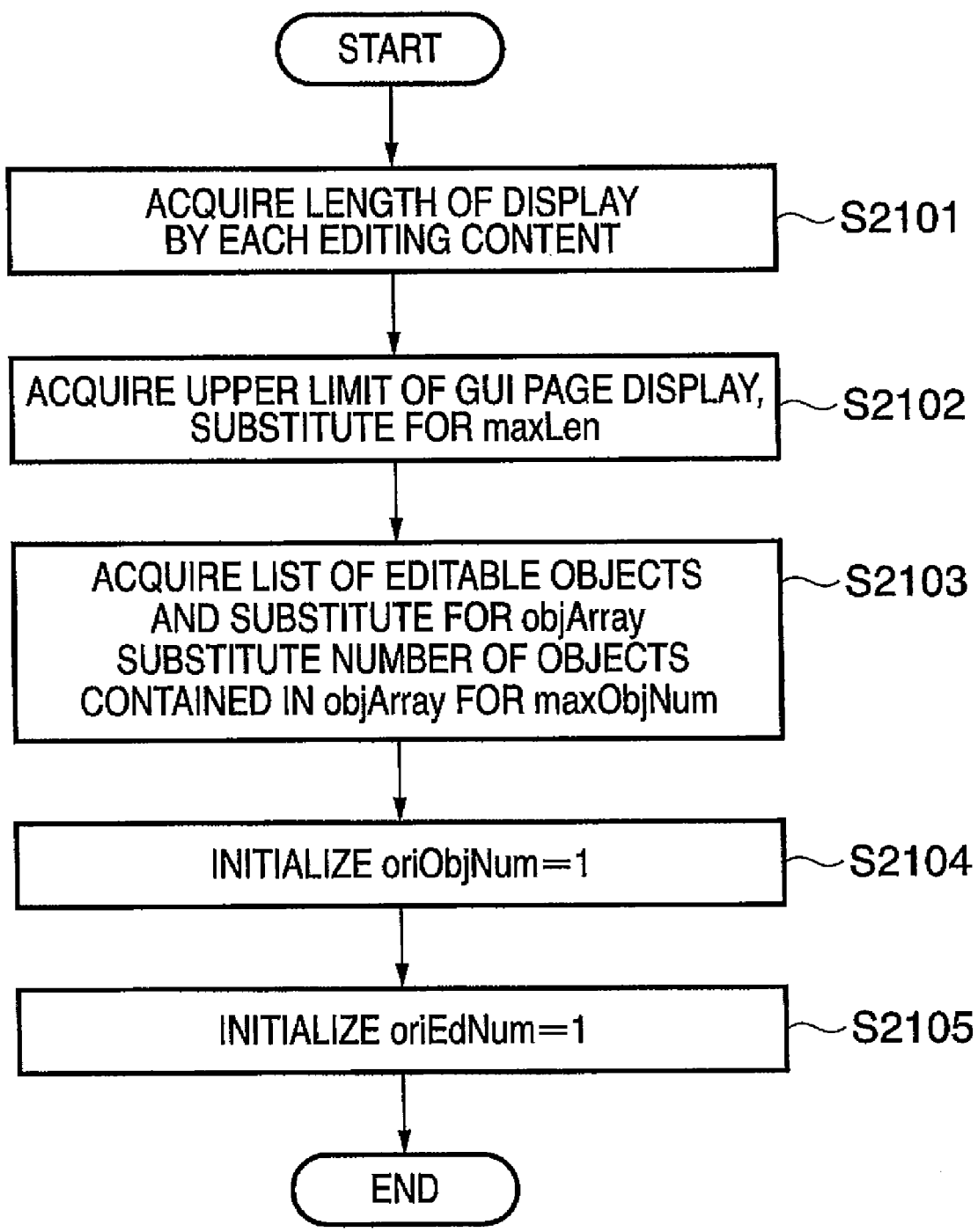
FIG. 31 is a flow chart illustrating operations in a process of displaying a variable-length Web page for an admitted subscriber to edit album data in the information processing apparatus according to the second embodiment of the present invention.

FIG. 31 and FIGS. 32A and 32B illustrate the processing involved when generating a Web page GUI 30, in which FIG. 31 shows an initialization process when the pages are first displayed and FIGS. 32A and 32B shows the processing involved in generating the GUI 30 after initialization is carried out.

First, a description is given of a case in which the link P1902 to the editing screen shown in FIG. 19 is clicked, or P3010 or P3011 shown in FIG. 30 are clicked. Specifically, a description is given of the flow chart for the processing carried out when the Web page GUI 30, which is an editing screen for a particular page, is first displayed. In this case, since initialization is required, following the processing illustrated in the flow chart shown in FIG. 31 the processing illustrated in the flow chart shown in FIGS. 32A and 32B is carried out.

After the start of processing, first, in step S2101, a length of an edit portion corresponding to the editing content, for example, "image replacement" or "text replacement", for example, from P3023 to P3026 shown in FIG. 30, is acquired. This length does not change depending on the edit location but is set in a file or the like of the server 122, and is acquired therefrom. Similarly, in step S2102, from a setting file or the like a maximum value of a length of an area to be used in editing is substituted for "maxLen". This value indicates a size of the maximum value that can be used as the area used for editing, as with P3023 through P3026, and setting this value appropriately makes it possible for an editor to work while viewing the preview.

The values acquired in these steps S2101 and S2102 are not values that must be acquired at every page, and therefore what is acquired when an application is opened or when a session is started may be used.

Next, processing proceeds to step S2103, a list of editable objects in that page is acquired and substituted for "objArray", and the number of objects contained in "objArray" is substituted for "maxObjNum". Editable objects in the case of FIG. 30 are the image (P3031) indicated by circled numeral 1 and the character sequence (P3030) indicated by circled numeral 2. If the editable objects in this page are limited to these two, then an ID or an instance or the like indicating information pertaining to these objects is stored in "objArray" and 2 is substituted for "maxObjNum".

Next, in step S2104, an "oriObjNum" that indicates the order of objects to start counting is initialized to 1, and in step S2105 an "oriEdNum" that indicates the order of editing to start counting is initialized to 1.

Next, the processing shown in FIGS. 32A and 32B is started. First, in steps S2204 through S2206, respectively, the following initializations are carried out: "len=0", "objNum=oriObjNum", and "edNum=oriEdNum". Next, processing then proceeds to step S2207 and the ID, instance, or the like indicating information pertaining to an "objNum"th in the "objArray" is substituted for "obj". In addition, in step S2208, a list of the editing content allowed in "obj" is acquired and substituted for "edArray", and the number of edits contained in "edArray" is substituted for "maxEdNum".

It should be noted that, at this time, in order to determine uniquely the order that is to be stored in "edArray", it is necessary to determine the order of display of the editing content separately using a setting file or the like and to store the editing content in that order when storing the editing content in the "edArray". For example, assume that the editing content is displayed in the order image replacement, image enlargement/reduction, image movement, text replacement, font instruction, and font size, and stored in that order in the "edArray".

Next, in step S2209, the "edNum"th editing content of the "edArray" is acquired and the length of the display area for that editing content is acquired. That length is then added to "len". Then, when a determination made in step S2210 indicates that "len" is larger than "maxLen", an editable range in the GUI 20 is secured.

Specifically, in step S2221, when the "edNum" is 1, processing proceeds to step S2222. Then, the Web page GUI 30 is generated to enable editing from the "oriEdNum"th editing content of the "or ObjNum"th object in the "objArray" up to the "objNum−1" last editing content. By contrast, when the "edNum" is not 1, processing proceeds to step S2223. Then, the Web page GUI 30 is generated to enable editing from the "oriEdNum"th editing content of the "or ObjNum"th object in the "objArray" up to the "objNum−1" editing content of the "objNum"th object. Then, in step S2224, the GUI 30 generated in step S2222 or step S2223 is transmitted to the admitted subscriber's PC 123. The PC 123, in accordance with the GUI 30, displays an editing screen like that shown in FIG. 30.

It should be noted that, in step S2216, when the "objNum" is equal to the "oriObjNum", or the "edNum" is equal to the "oriEdNum", this means that at the first "len" is greater than "maxLen". Therefore, prior to the processes carried out in steps S2222 and S2223, the following processes are executed. Specifically, in step S2217, when "edNum" is smaller than "maxEdNum", in step S2220 "edNum" is incremented. Moreover, when "edNum" is greater than or equal to "maxEdNum", in step S2218 "objNum" is incremented, and further, in step S2219 1 is substituted for "edNum".

In addition, when "oriObjNum" is 1, and further, when "oriEdNum" is 1, P2912 is not displayed. Similarly, when "objNum" is equal to or greater than "maxObjNum+1", P2913 is not displayed.

Further, numbers displayed as circled numbers in the preview are determined by the order in the "objArray" of the objects made editable in the same page. Specifically, 1 is assigned to the "oriObjNum"th object, and continues therefrom. These numbers are then synthesized in the preview at a place corresponding to coordinates indicated by /Icon in the PDF. In tandem therewith, circled numbers are also be displayed in areas used for editing such as P3023 through P3026.

By contrast, in step S2210, when "len" is equal to or less than "maxLen", or when in step S2211 "edNum" is smaller than "maxEdNum", processing proceeds to step S2212. Then, "edNum" is incremented and the steps S2209 and S2210 are repeated.

However, when "len" is equal to or less than "maxLen", and further, "edNum" is equal to or greater than "maxEdNum", processing then proceeds to step S2213, the "objNum" is incremented, processing then proceeds further to step S2214, and 1 is substituted for "edNum".

Then, that result is evaluated in step S2215, and when it is determined that "objNum" is equal to or less than "maxObjNum", the steps of from S2207 through S2210 are repeated. However, when "objNum" is greater than "maxObjNum", all the editing of all the objects is checked. Therefore, processing proceeds to step S2216 and, depending on whether or not "edNum" is 1, the appropriate Web page GUI 20 is generated in steps S2222 or S2223.

It should be noted that "objArray" and "maxObjNum" for each page is associated with the page number as session information and kept, and used throughout the same session.

When the link P3013 of the GUI 30 shown in FIG. 30 that shows the next editing content is clicked, the editing screen GUI 20 is once again displayed. At this time, the "edNum" and "objNum" are reported through argument or the like. Then, in the next page, these values are used as "oriObjNum" and "oriEdNum", respectively. Processing thereafter is the same as that described with reference to the flow chart shown in FIGS. 32A and 32B. By contrast, the processing involved when the link P2912 to show the previous editing content is clicked, although different from the processing shown in FIGS. 32A and 32B, may be accomplished by searching from the bottom toward the top of the "objArray". The basic idea of this processing is not at all different from that described above, and therefore a description thereof is omitted.

(Operations Performed by the Admitted Subscriber and the Corresponding Processes (3))

It should be noted that, because there is the icon 2730 (or P2130, P2230, P2330, P2430, P2530, P2730, P2731) indicating an editable object, the screen could be considered incomplete as a preview. Therefore, in the foregoing description the confirmation screen and the editing screen are made separate. However, the function of the confirmation screen may just as easily be accomplished with the editing screen. In such a case, where there is no editable object, the Web page GUI 19 with no link P1902 is displayed. Where there is an editable object, in place of the link P2003 (or P2103 through P2703) a GUI 20 (or GUI 21 through GUI 23, GUI 25 through GUI 27) having a link (P1903) to an order screen is displayed.

When the admitted subscriber finishes editing, he or she clicks the link P2003 (or P2103, P2203, P2303, P2503, P2603, P2703). The server 122 then generates album data reflecting the editing results, and saves the edited album data separately from the album data that the original album editor created, as album data associated with a session ID. Then, the server 122 generates JPEG data by rendering the relevant page(s) of the album data and displaying it on the GUI 19 so that the admitted subscriber can check the contents.

When the admitted subscriber uses links P1910, P1911, the server 122 either generates JPEG data then and there or uses as a preview image JPEG generated previously, and the GUI 19 is displayed, enabling the contents to be checked.

It should be noted that the present embodiment saves the album data edited by the admitted subscriber separately from the album data that the original album editor created, as album data associated with a session ID. This is done in order to make it possible, when multiple admitted subscribers exist, for each of the admitted subscribers to edit on the basis of album data that the original album editor created and to create separate album data. Therefore, by associating the edited album data with a session ID and saving it the album data is only referenced as long as the session continues. Thus, once the session no longer continues it is necessary to delete the data.

In addition, instead of an ID that continues for only a short period of time like a session ID, an ID that continues for a long time period and is not reused may be issued. In such a case, such an ID may be saved on each individual admitted subscriber's PC 123 as Cookie information or clearly provided to each individual admitted subscriber, with the ID and the edited album data associated so as to enable re-ordering and re-editing of the edited album data.

Further, the URL provided to the admitted subscriber may be changed according to the e-mail address (and a password provided by a separate e-mail). Then, the admitted subscriber is asked to enter the e-mail address (and the password provided separately) before checking the contents of the album data. Doing so makes possible an authentication process, as well as asking for entry of an e-mail address when uploading and saving album data that is the result of editing in accordance with the registered e-mail address. Adopting such a method makes it possible to allow editing only by persons who have been authenticated, the saving of data that is the result of editing for each admitted subscriber, and the re-ordering and re-editing of such data.

It should be noted that although in the present embodiment a case in which an admitted subscriber carries out editing is described in detailed, such admitted subscriber editing is not a requirement. In the event that the admitted subscriber thinks that the album data that the original album editor created is good as is, then when the GUI 19 is first displayed the admitted subscriber can click the link P1903 and order.

(Other Embodiments)

Furthermore, the invention can be implemented by supplying a software program, which implements the functions of the foregoing embodiments, directly or indirectly to a system or apparatus, reading the supplied program code with a computer of the system or apparatus, and then executing the program. In such a case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In such a case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, and optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client the computer can be connected to a website on the Internet using a browser of the client computer, in the computer program of the present invention or an automatically installable compressed file of the program can be downloaded to a recording medium such as a hard disk. Further, the program of the present invention can be supplied by dividing the program code constituting the program into a plurality of files and downloading files from different websites. In other words, a WWW (World Wide Web) the server then downloads, to multiple users, the program files that implements the functions of the present invention by computer is also covered by the claims of the present invention.

It is also possible to input and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-331139 and 2006-331135, both filed on Dec. 7, 2006, which are hereby incorporated by reference herein in their entirety.

What is claimed is:

1. An album creating apparatus having a processor comprising:
   an editing unit configured to edit a plurality of images;
   a creation unit configured to create album data including the plurality of edited images;
   a selecting unit configured to select at least one of the plurality of edited images which configure the album data;
   a setting unit configured to set either allowance or disallowance of re-edition of the each selected edited image and a re-edition content from a plurality of content type, as re-edition allowance/disallowance information;
   an embedding unit configured to embed the re-edition allowance/disallowance information of the each selected edited image of the album data and tamper prevention data of the album data to the album data; and
   an uploading unit configured to upload the album data, to which the re-edition allowance/disallowance information and the tamper prevention data are embedded, to a server apparatus via a network,
   wherein the album data is downloaded from the server apparatus to a client apparatus via a network, and the edited images of the album data is re-edited based on the embedded re- edition allowance/disallowance information using an application in the client apparatus,
   wherein said tamper prevention data is deleted from said album data whenever any of said embedded re-edition allowance/disallowance information is deleted from said album data by the client apparatus,
   wherein the server apparatus does not print the album data including the re-edited image uploaded by the client apparatus if the tamper prevention data is not embedded in the album_data, and
   wherein the editing unit, the creation unit and the setting unit are realized using the processor at least.

2. The apparatus according to claim 1, wherein the re-edition content includes at least one of replacement of an image, an arranged position of an image, a size of an image, and designation of trimming area of an image.

3. An album editing apparatus having a processor comprising:
   a download unit configured to download album data from a server apparatus via a network, the album data being configured with a plurality of edited images, and embedded with re-edition allowance/disallowance information indicative of allowance or disallowance of re-edition of each of the edited images and re-edition content, and tamper prevention data of the album data;
   a re-editing unit configured to execute re-edition of the allowed re-edition content on the edited image for which re-edition is allowed on the basis of the re-edition allowance/disallowance information embedded in the album data using a predetermined application;

a deletion unit that deletes the tamper prevention data from the album data whenever any of said embedded re-edition allowance/disallowance information is deleted from the album data; and an uploading unit configured to upload the re-edited album data to the server apparatus via the network, wherein the uploaded re-edited album data is not printed by the server apparatus if the tamper prevention data is not embedded in the album data, and wherein the re-editing unit and the creation unit are realized using the processor at least.

4. The apparatus according to claim 3 further comprising a generation unit configured to generate an editorial screen for displaying an operation unit for inputting an image for which re-edition is allowed and an instruction with respect to the re-edition content on the basis of the re-edition allowance/disallowance information which is written to the first album data, wherein the generation unit is realized using the processor at least.

5. The apparatus according to claim 4, wherein the generation unit changes the re-edition content to be displayed on the editorial screen at once on the basis of the number of images for which re-edition is allowed.

6. The apparatus according to claim 3, wherein the application is downloaded from the server apparatus to the client apparatus.

7. An album creating method comprising:
an editing step of editing a plurality of images;
a creation step of creating album data including the plurality of edited images;
a selecting step of selecting at least one of the plurality of edited images which configure the album data;
a setting step of setting either allowance or disallowance of re-edition of the each selected edited image and a re-edition content from a plurality of content type, as re-edition allowance/disallowance information;
an embedding step of embedding the re-edition allowance/disallowance information of the each selected edited image of the album data and tamper prevention data to the album data of the album data; and
an uploading step of uploading the album data, to which the re-edition allowance/disallowance information and the tamper prevention data are embedded, to a server apparatus via a network, wherein the album data is downloaded from the server apparatus to a client apparatus via a network, and the edited images of the album data is re-edited based on the embedded re-edition allowance/disallowance information using an application in the client apparatus, wherein said tamper prevention data is deleted from said album data whenever any of said embedded re-edition allowance/disallowance information is deleted from said album data by the client apparatus, wherein the server apparatus does not print the album data including the re-edited image uploaded by the client apparatus if the tamper prevention data is not embedded in the album data.

8. A non-transitory storage medium readable by an information processing apparatus, said storage medium storing a program which is executable by the information processing apparatus and comprises program codes realizing the electronic album editing method described in claim 7.

9. An album editing method comprising:
a download step of downloading album data from a server apparatus via a network, the album data being configured with a plurality of edited images, and embedded with re-edition allowance/disallowance information indicative of allowance or disallowance of re-edition of each of the edited images and re-edition content, and tamper prevention data of the album data;
a re-editing step of executing re-edition of the allowed re-edition content on the edited image for which re-edition is allowed on the basis of the re-edition allowance/disallowance information embedded in the album data using a predetermined application;
a deletion step of deleting the tamper prevention data from the album data whenever any of said embedded re-edition allowance/disallowance information is deleted from the album data; and
an uploading step of uploading the re-edited album data to the server apparatus via the network,
wherein the uploaded re-edited album data is not printed by the server apparatus if the tamper prevention data is not embedded in the album data.

10. A non-transitory storage medium readable by an information processing apparatus, said storage medium storing a program which is executable by the information processing apparatus and comprises program codes realizing the electronic album editing method described in claim 9.

\* \* \* \* \*